United States Patent [19]

Toyota et al.

[11] Patent Number: 5,732,060
[45] Date of Patent: Mar. 24, 1998

[54] OPTICAL PICKUP AND OPTICAL RECORDING MEDIUM REPRODUCING APPARATUS HAVING A WIRE GRID UNIT

[75] Inventors: Kiyoshi Toyota, Tokyo; Kimihiro Saito, Saitama; Noriaki Nishi, Chiba; Hitoshi Tamada; Shuichi Matsumoto, both of Kanagawa, all of Japan

[73] Assignee: Sony Corporation, Japan

[21] Appl. No.: 607,448

[22] Filed: Feb. 27, 1996

[30] Foreign Application Priority Data

Mar. 4, 1995 [JP] Japan ................. 7-070631

[51] Int. Cl.⁶ ........................................... G11B 7/00
[52] U.S. Cl. ................................... 369/112; 369/110
[58] Field of Search ............................ 369/110, 109, 369/112, 44.23, 100, 118, 119, 120, 124, 44.24, 44.37, 44.41

[56] References Cited

U.S. PATENT DOCUMENTS

| 3,436,143 | 4/1969 | Garrett . | |
|---|---|---|---|
| 4,794,585 | 12/1988 | Lee | 369/44.23 X |
| 4,823,331 | 4/1989 | Yoshitoshi et al. | 369/112 X |
| 4,918,675 | 4/1990 | Lee | 369/112 X |
| 5,124,868 | 6/1992 | Matsubayashi et al. | 369/110 X |

FOREIGN PATENT DOCUMENTS

| 0325 140 | 7/1989 | European Pat. Off. . |
| 0348 950 | 1/1990 | European Pat. Off. . |
| 0469 580 A2 | 2/1992 | European Pat. Off. . |
| 0550 036 | 7/1993 | European Pat. Off. . |
| 0640 962 | 3/1995 | European Pat. Off. . |
| 7114746 | 2/1995 | Japan . |

OTHER PUBLICATIONS

Lochbihler, Hans and Predehl, Peter, "Characterization of X-Ray Transmission Gratings", Applied Optics, vol. 31, No. 7, Mar. 1, 1992.

*Primary Examiner*—Paul W. Huber
*Attorney, Agent, or Firm*—Ronald P. Kananen

[57] ABSTRACT

An optical pickup and an optical recording medium reproducing apparatus smaller and more reliable than conventional optical pickups and optical recording medium reproducing apparatuses. These are provided with a one-dimensional metal grid which is formed so that the ratio h/d that the pitch "d" and the thickness of metal conductors "h" constituting the wire grid is about 0.1 or more, and also a group of light receiving units which receive light beams split by the one-dimensional metal grid.

14 Claims, 17 Drawing Sheets

OPTICAL PICKUP AND OPTICAL RECORDING MEDIUM REPRODUCING APPARATUS HAVING A WIRE GRID UNIT

BACKGROUND OF THE INVENTION

1. Field of the Invention

This invention relates to an optical pickup and an optical recording medium reproducing apparatus, and more particularly, to such that are suitable for reproducing data from an magneto-optical recording medium.

2. Description of the Related Art

Heretofore, in a magneto-optical recording medium reproducing apparatus, an optical pickup 1 for recording and reproducing a magneto-optical disc having a construction as shown in FIG. 1 is provided. In the optical pickup 1, a light emitted from a laser diode (LD) 2 is focused on a disc 5 through a polarization beam splitter (PBS) 3 and an objective lens 4, and the light reflected from the disc 5 is guided to a photodetector (PD) 7 through the objective lens 4, the polarization beam splitter 3, and a multilens 6.

In the actual optical pickup 1, optical parts, such as the laser diode 2, photodetector 7, and polarization beam splitter 3 are provided separatively, so that an optical pickup for recording and reproducing a magneto-optical disc is insufficient in downsizing and improvement of pickup reliability.

Moveover, as an element for reproducing an optical recording medium, there have been known a composite optical element in which a laser diode, a photodetector, and a prism for light beam splitting which is placed on the photodetector are mounted on the same board (See U.S. Pat. No. 4,823,331), and a monolithic light receiving and emitting device in which a light emitting unit and a raising mirror which are formed by the semiconductor process and a light receiving unit are provided (See Japanese laid open patent application No. 114746/1995).

When a light receiving and emitting element of non-polarization optical system is used, it is impossible to detect a magneto-optical signal, and it is impossible to reproduce a magneto-optical disc.

Therefore, it is considered that the use of a one-dimensional metal grid may be used as a polarizer in the detection of a magneto-optical signal. A one-dimensional metal grid for receiving infrared rays ranging from a wavelength of about 3 to 10 μm, as shown in FIG. 2, is formed by many wires 9 placed in parallel with each other. Wherein, when the pitch "d" is selected shorter than the wavelength λ of an incident light, such a characteristic that reflects a polarization component parallel to the wires 9 (P polarization) and transmits a polarization component perpendicular to the wires 9 (S polarization). The one-dimensional metal grid 8 operates as a polarizer by utilizing this characteristic.

In the use of the one-dimensional metal grid 8 as a polarizer, two conditions should be satisfied that the ratio b/d of the width "b" of the wire 9 to the pitch "d" is b.d⁻0.6, and the ratio λ/d of the wavelength λ to the pitch "d" is λ/d≧5. Therefore, to polarize light in the visible and near-infrared regions, for example, light about 780 nm in wavelength, the pitch "d" needs to be a small value about 100 nm when the refractive index of an ambient medium is taken into account, and thus such a grating is extremely difficult to fabricate.

SUMMARY OF THE INVENTION

In view of the foregoing, an object of this invention is to provide an optical pickup for a magneto-optical recording medium and a magneto-optical recording medium reproducing apparatus which is smaller, more reliable, and that it is easy to fabricate.

The foregoing objects and other objects of the invention have been achieved by the provision of a one-dimensional metal grid that is formed so that the ratio h/d of the pitch "d" to the thickness "h" of a metal conductor constituting a wire grid, is about 0.1 or more, and a group of light receiving elements receiving light separated by the one-dimensional metal grid.

By forming a resonance region in the characteristics of transmission and reflection of the one-dimensional metal grid by utilizing the thickness of a metal conductor constituting one-dimensional metal grid, a smaller and more reliable optical pickup for a magneto-optical recording medium can be accomplished as compared with their conventional equivalents.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
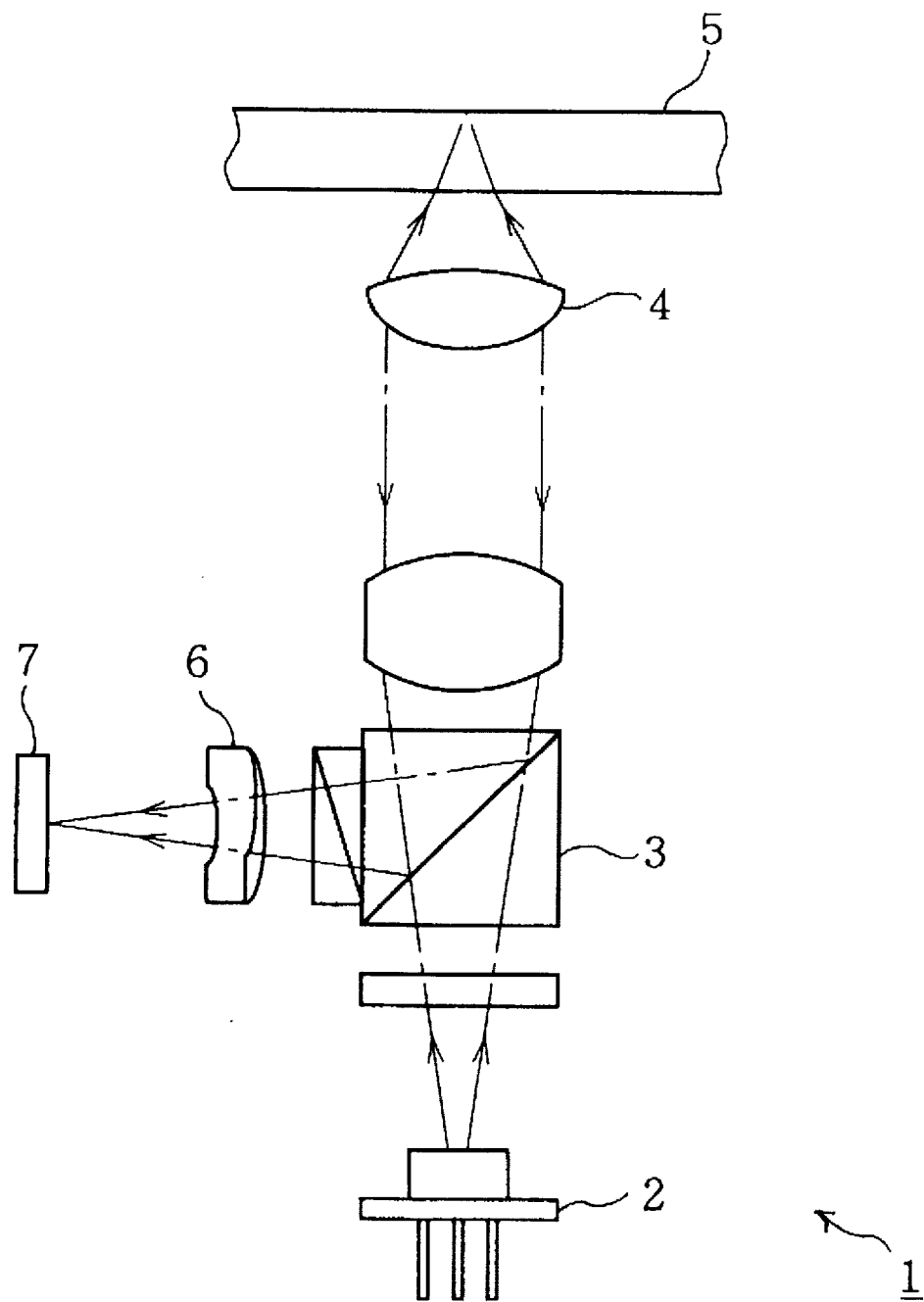
FIG. 1 is a schematic diagram showing the arrangement of a pickup.
Figure 2:
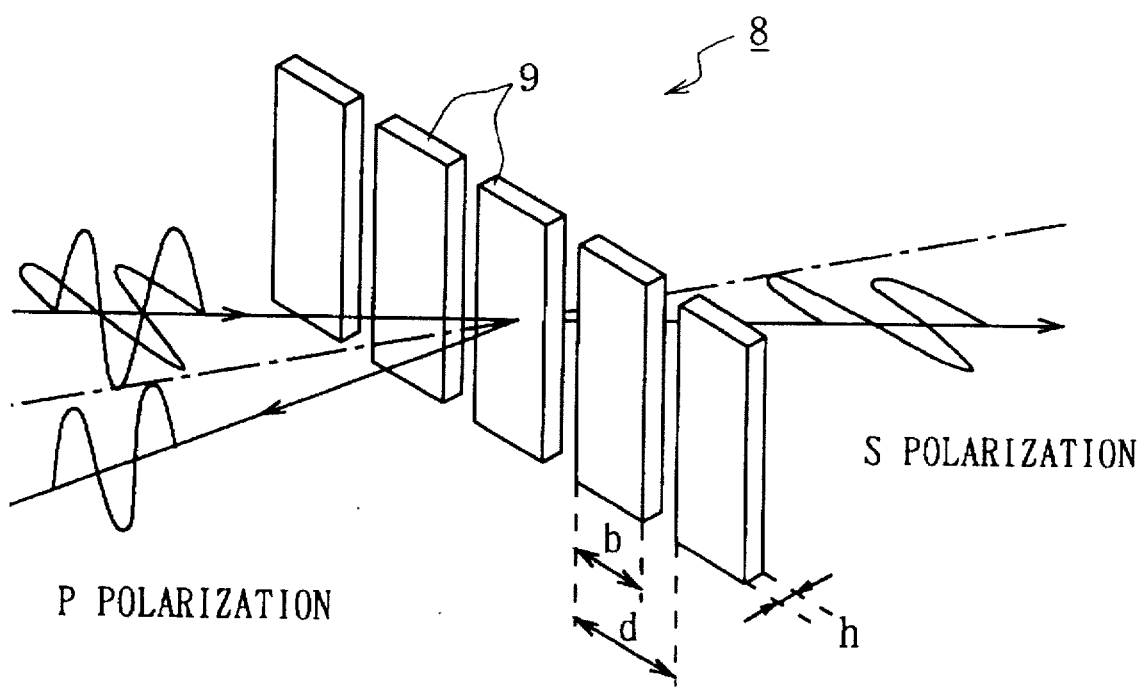
FIG. 2 is a schematic diagram showing the arrangement of one-dimensional metal grid.
Figure 3:
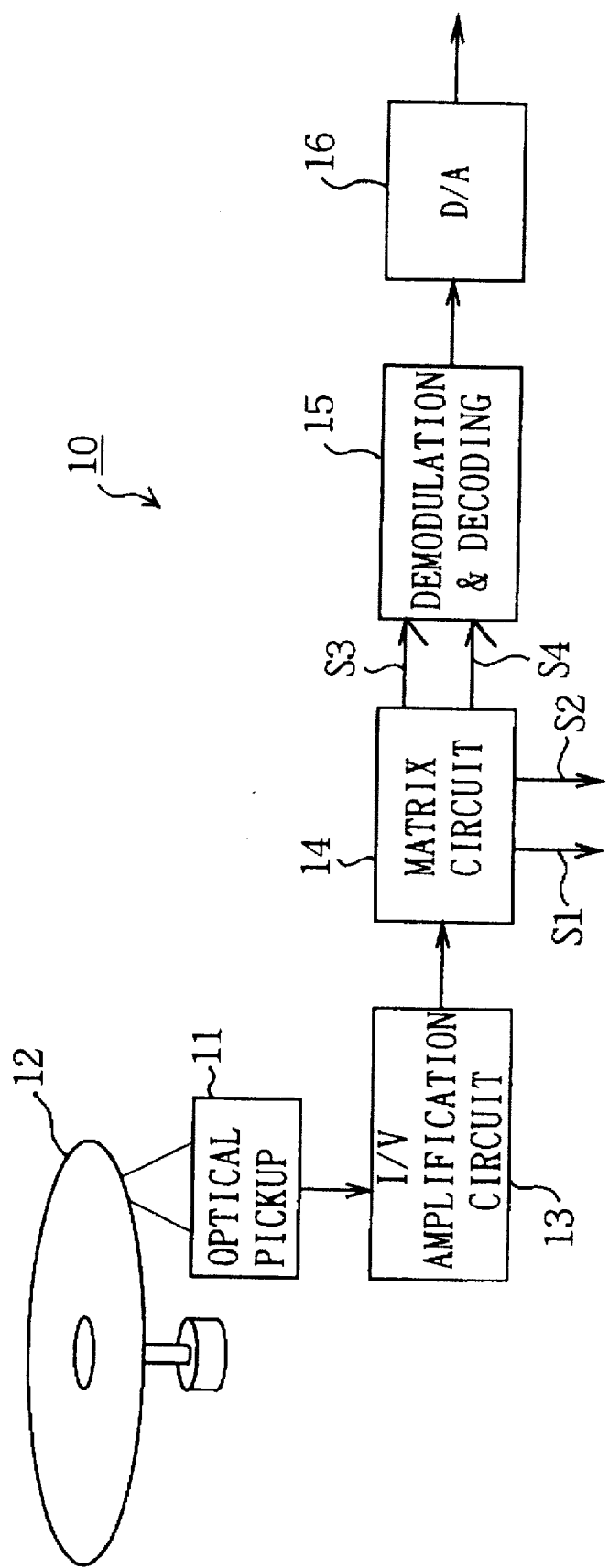
FIG. 3 is a schematic diagram showing the general construction of the optical recording medium reproducing apparatus according to this invention.

Preferred embodiments of this invention will be described with reference to the accompanying drawings:

(1) Optical Recording Medium Reproducing Apparatus (1-1) General Construction of Optical Recording Medium Recording and Reproducing Apparatus FIG. 3 shows a magneto-optical recording and reproducing apparatus 10 as an example of optical recording medium reproducing apparatus.

In the magneto-optical recording and reproducing apparatus, a laser light is focused on a magneto-optical disc 12 by an optical pickup 11 to irradiate a spot of light with a predetermined intensity necessary for magneto-optical recording and reproducing on the disc. The light reflected to the magneto-optical disc 12 is received by the optical pickup 11 and converted to a detection signal. Then the detection signal is current-to-voltage converted by an I-V amplification circuit 13. The signal output from the I-V amplification circuit 13 is calculated at a matrix circuit 14 and a tracking error signal S1, a focus error signal S2, a magneto-optical signal S3, and an information signal S4 are output. In reproducing, the magneto-optical signal S3 and the information signal S4 are demodulated and decoded by a demodulating and decoding circuit 15, and then output to a digital-to-analog (D/A) converting circuit 16. Thereby, reproduction output of an analog signal is output from the magneto-optical recording and reproducing apparatus 10.

(1-2) Optical Pickup

Figure 4:
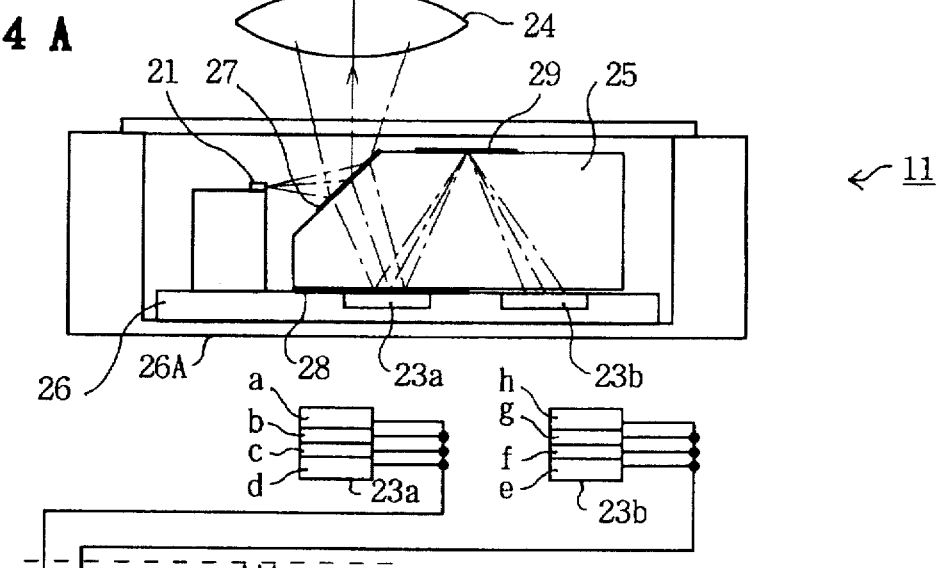
FIG. 4A is a schematic diagram showing the arrangement of the optical pickup according to this invention.
FIG. 4B is a block diagram showing the signal processing circuit of a photodetector.
Figure 4:
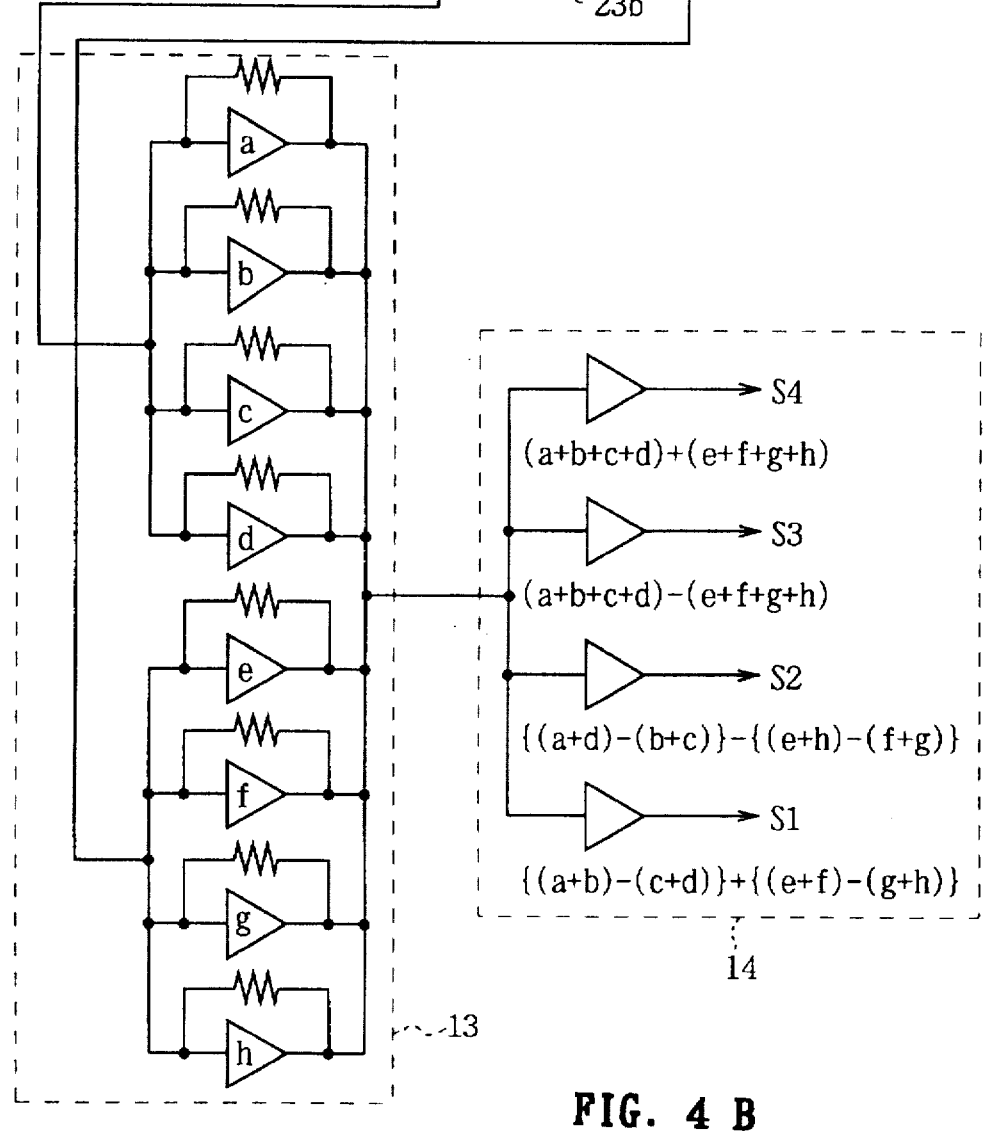

FIG. 4A shows an embodiment of the arrangement of the optical pickup 11 to be provided in the magneto-optical recording and reproducing apparatus 10. The optical pickup 11 is composed of a laser light source 21 for emitting a light beam; photodetectors 23a, 23b for detecting a signal of a magneto-optical disc 22; an objective lens 24 for focusing the emitted light from the laser light source 21 on the signal recording surface of the magneto-optical disc 22; an optical wave director 25 for reflecting the emitted light to the objective lens 24 and directing the reflected light to the photodetectors 23a, 23b; a board 26 mounting the laser light source 21, the photodetectors 23a, 23b, and the optical wave director 25 on; and a support 26A supporting the board 26. The optical wave director 25 is composed of: a beam splitter film 27 for reflecting the emitted light from the light source 21 and transmitting the returned light from the magneto-optical disc 22; one-dimensional metal grid 28 for transmitting a predetermined polarization component in the light beam that is transmitted through the beam splitter film 27 and directing that to the photodetector 23a, and for reflecting other polarization components; and all reflection films 29 for reflecting the light beam reflected by the one-dimensional metal grid 28 to the photodetector 23b. It is assumed that the beam splitter film 27 has an S polarization transmittance Ts of 30% and a P polarization transmittance Tp of 65%.

Figure 5:
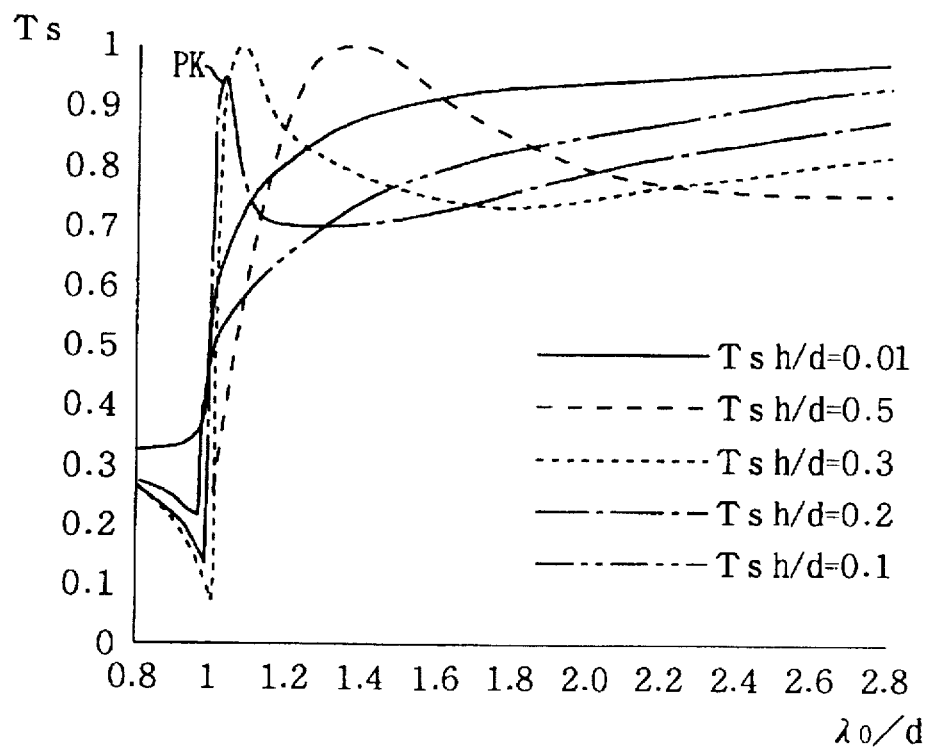
FIG. 5 is a characteristic curvilinear diagram showing the occurrence of a resonance region (when h/d=0.1, it occurs at about $\lambda_0/d$) in the relation between Ts and $\lambda_0/d$ when b/d=0.4.

Here, the one-dimensional metal grid 28 satisfies the requirement of $h/d \geq 0.1$ regarding the relation between the thickness "h" of the wire 28A and the pitch "d", so that it operates in the resonance region as described below. If the predetermined requirements are satisfied in the one-dimensional metal grid 28, P polarized light which is parallel to the wire grid (the electric filed is parallel with the wire grid) is reflected and S polarized light which is perpendicular to the wire grid (the electric field is at right angles to the wire grid) is transmitted. As for the one-dimensional metal grid 28, it is assumed that the wire of the width is "b", the pitch is "d", and the thickness is "h". FIG. 5 shows the relation between the S polarization transmittance Ts and $\lambda_0/d$ when b/d=0.4 in variations of h/d, where $\lambda_0$ is the wavelength of light around the grating, and $\lambda_0=\lambda/n$. As seen from the graph of FIG. 5, the "resonance region" (where the peak of Ts~1 exists) starts at h/d ~0.1 or more. Especially, when h/d=0.1 and $\lambda_0/d$ is about 1, a steep peak PK is found. By utilization of the resonance region having the steep peak, $\lambda_0/d$ become ¼ the value without using the resonance region, so that the pitch "d" can be increased by a factor of four, compared with conventional optical pickups under the constant wavelength.

FIG. 4B shows the division patterns and the signal generation manner of two photodetectors 23a and 23b in the optical pickup 11. The photodetector 23a, placed relatively up the incident light toward the optical wave director 25, and the photodetector 23b, placed relatively down the incident light, are divided respectively into four light receiving regions (regions a, b, c, and d for the photodetector 23a, and regions e, f, g, and h for the photodetector 23b), and the current output from respective light receiving regions are current/voltage converted at the I-V amplification circuit 13. Then the output is calculated at the matrix circuit 14, as a result, a tracking error signal S1, a focus error signal S2, and information signals S3 and S4 are obtained. The information signal S3 is a magneto-optical signal corresponding to the Kerr rotation angle of the reflected light to the magneto-optical disc 12, and the information signal S4 is an RF signal (light intensity signal) corresponding to the pit.

(2) Principle Constitution of One-dimensional Metal Grid

Figure 6:
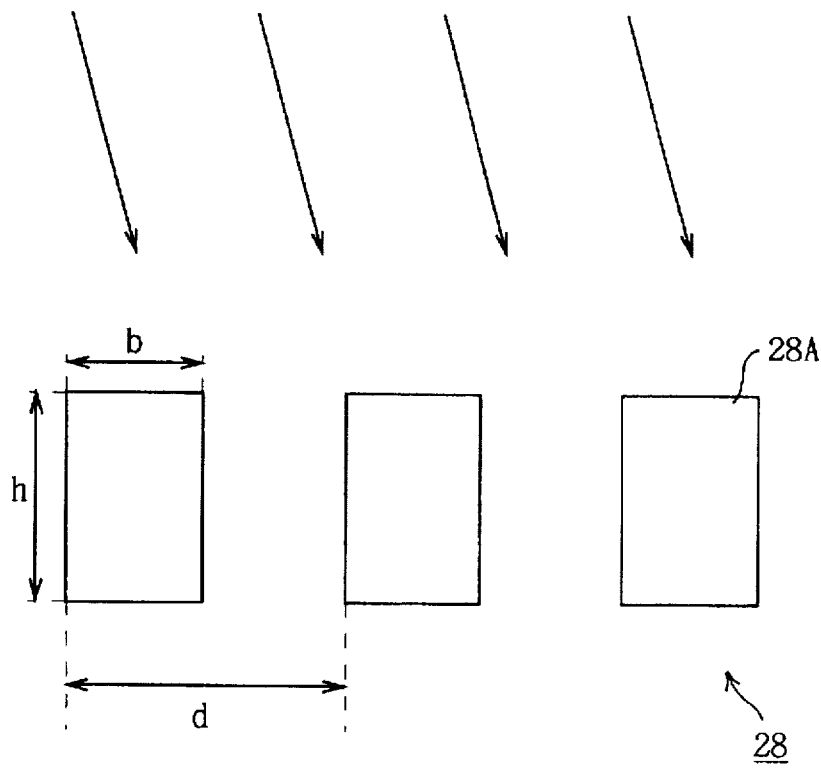
FIG. 6 is a cross section of one-dimensional metal grid.
Figure 7:
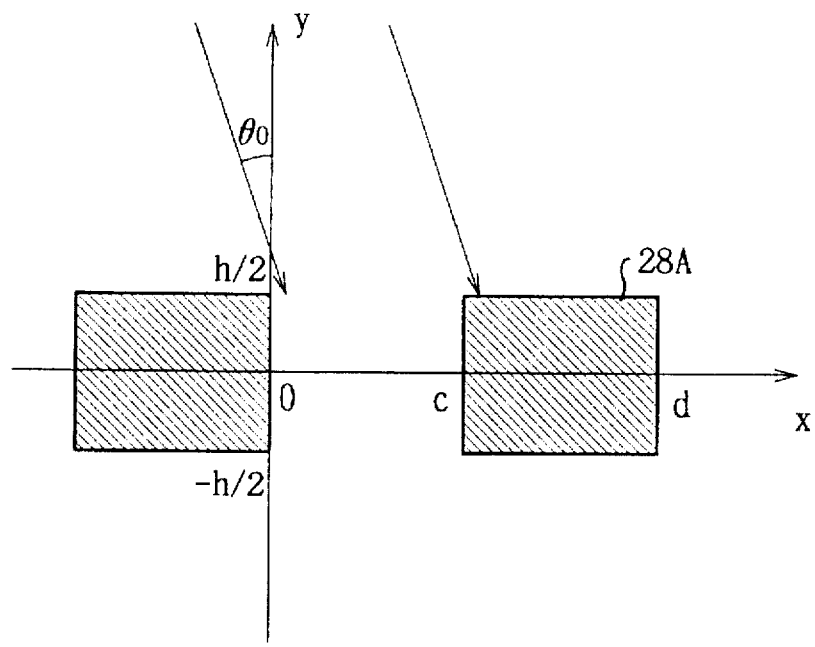
FIG. 7 is a schematic diagram showing a coordinate system for the cross section of one-dimensional metal grid.

As shown in a cross section of FIG. 6, the one-dimensional metal grid 28 is constructed based on the theory considering the ratio of the wavelength "h" and the pitch "d", h/d. In the case where the cross section of the wire 28A of the one-dimensional metal grid 28 is rectangular, the modal expansion methods can applied. In the modal expansion methods, it is separated the region between the wires 28A from the region outside the area in consideration. In the region outside the area, it is subjected the Rayleigh expansion (plane-wave expansion) for the electromagnetic field in similar to the normal refraction theory. In the region between the wires 28A (in FIG. 7, $0 \leq x \leq c$ and $-h/2 \leq y \leq h/2$), it is subjected the modal expansion, expansion into a mode satisfying boundary conditions at $x=0$ or $x=c$, for the electromagnetic field. And a coefficient of expansion is determined according to the matching condition between two expansion methods at $0 \leq x \leq d$ and $y=\pm h/2$. Further details of the modal expansion will be described later.

(2-1) Principle of One-dimensional Metal Grid

It is described about the principle of a one-dimensional metal grid. It is assumed that the wire 28A is made of metal being a perfect conductor. On the modal expansion, the following expressions are satisfied.

An S polarization wave (a TM wave, that is, the magnetic field "f" is parallel to the wire grid 28), is expressed by the following equation:

$$f(x,y) = \sum_{m=0}^{\infty} \phi_m(x,y) \quad (1)$$

$$\phi_m(x,y) = \cos(\beta_m x)[a_m \sin(\mu_m y) + b_m \cos(\mu_m y)]$$

$$\beta_m = m\frac{\pi}{c}, \mu_m = +(k_0^2 - \beta_m^2)^{1/2}$$

where $a_m, b_m$ are complex amplitude

Equation (1) is derived under the condition that the Neumann boundary condition is satisfied (the value of the derivative for the direction of a normal at the interface is zero) when $x=0$ or $x=c$.

Thus for a TM wave, a light is transmitted through the magnetic field between the wires 28A.

A P polarization wave (a TE wave, that is, the electric field is parallel to the wire grid) is expressed by the following equation:

$$\phi_m(x,y) = \sin(\beta_m x)[a_m \sin(\mu_m y) + b_m \cos(\mu_m y)] \quad (2)$$

Equation (2) satisfies the Dirichlet boundary conditions (the value is zero at the interface because of no electric field in the conductor) when $x=0$ or $x=c$.

In this case, the term of zero is nonexistent as to "m" because $\sin(\beta_0 x)=0$ for $\beta_0=0$. This means that there is no electric field in a region between the wires 28A if terms of first or subsequent degree are neglected.

On the one-dimensional metal grid 28 under the approximate condition (neglecting terms of m-th degree ($m \geq 1$)), a TM wave can be entered a region between one-dimensional metal grid, but a TE wave cannot. In other words, a TM wave has an electromagnetic field transmitting a light, but a TE wave has no electromagnetic field thus reflects a light.

(2-2) Difference of Modal Expansion Methods from Conventional Theories

Figure 8:
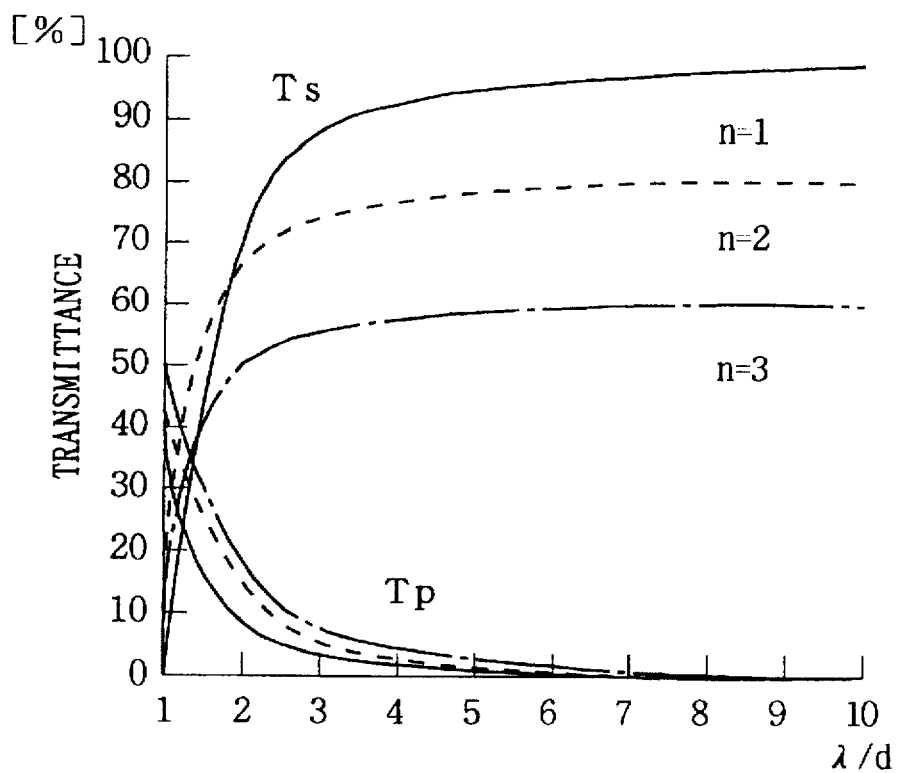
FIG. 8 is a characteristic curvilinear diagram showing the relation between the ratio of wavelength to the pitch on the one hand and the S polarization transmittance and the P polarization transmittance on the otherhand according to the conventional design theory.
Figure 9:
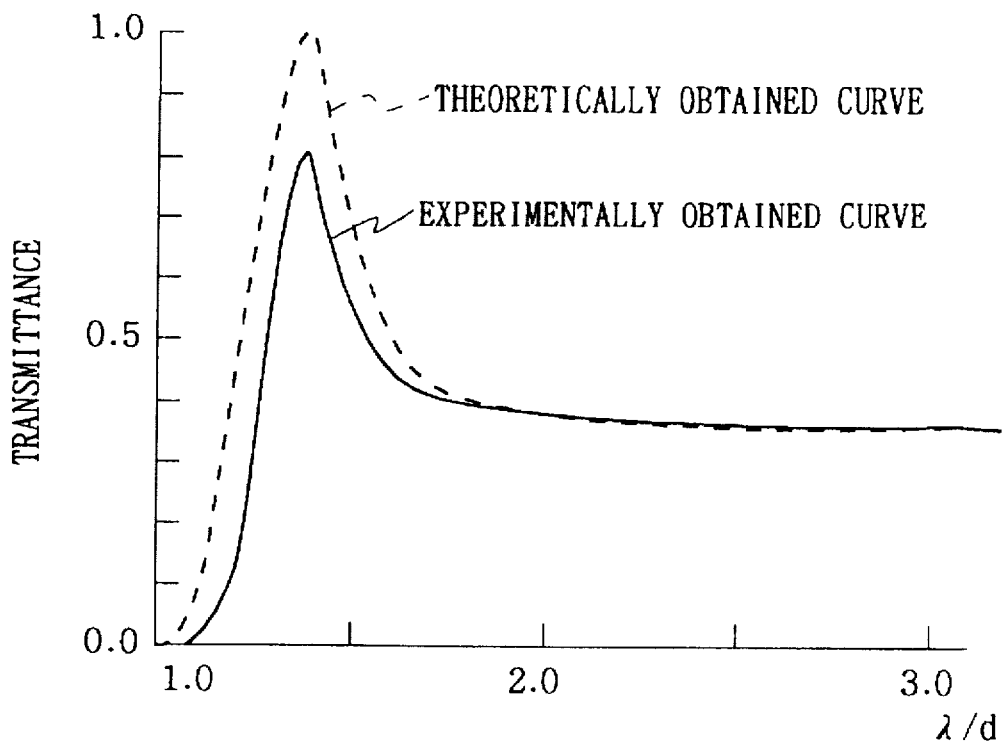
FIG. 9 is a characteristic curvilinear diagram showing the relation between the ratio of wavelength to the pitch and the transmittance, the relation as found by the modal expansion methods is used.
Figure 12:
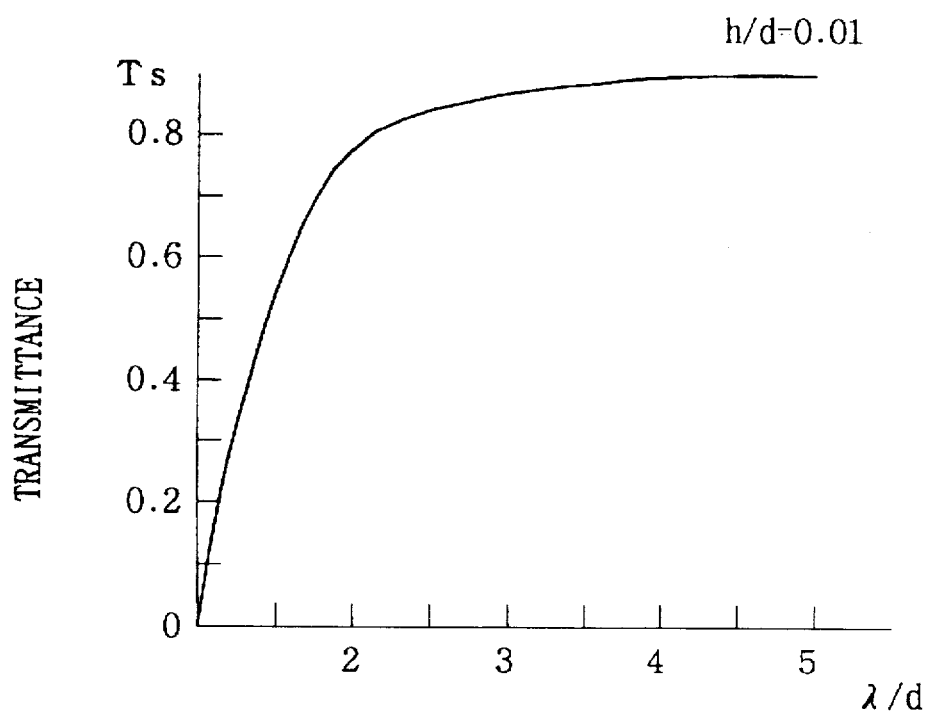
FIG. 12 is a characteristic curvilinear diagram showing the characteristics of the S polarization wave transmittance, when h/d=0.01.

FIG. 8 is a graph of the relation of the S polarization transmittance Ts to the ratio $\lambda/d$ of the wavelength $\lambda$ and the pitch d in a conventional theory. FIG. 9 is a graph of the relation of the S polarization transmittance Ts to the ratio $\lambda/d$ in the modal expansion methods. As found from the figures, those are extremely different. For comparison of those and obtaining of the S polarization reflectance Rs and the P polarization reflectance Rp, its theorical refraction will be implemented that 0th degree (main transmitted and reflected light) and ±1st degree (evanescent wave) in Rayleigh expansion, and also 0th degree (S polarization wave and TM wave) and 1st degree (P polarization wave and TE wave) (P polarization waves have no 0th-degree mode) in modal expansion.

It approximates only terms of low degree as the above, obtains values of S polarization transmittance Ts, P polarization transmittance Tp, S polarization reflectance Rs, and P polarization reflectance Rp, and makes the graph by using Mathematica in the following conditions:

(1) the light is incided perpendicularly,
(2) the wire is made of metal being perfect conductors, and
(3) the pitch "d" satisfies $d=2c$.

Figure 10:
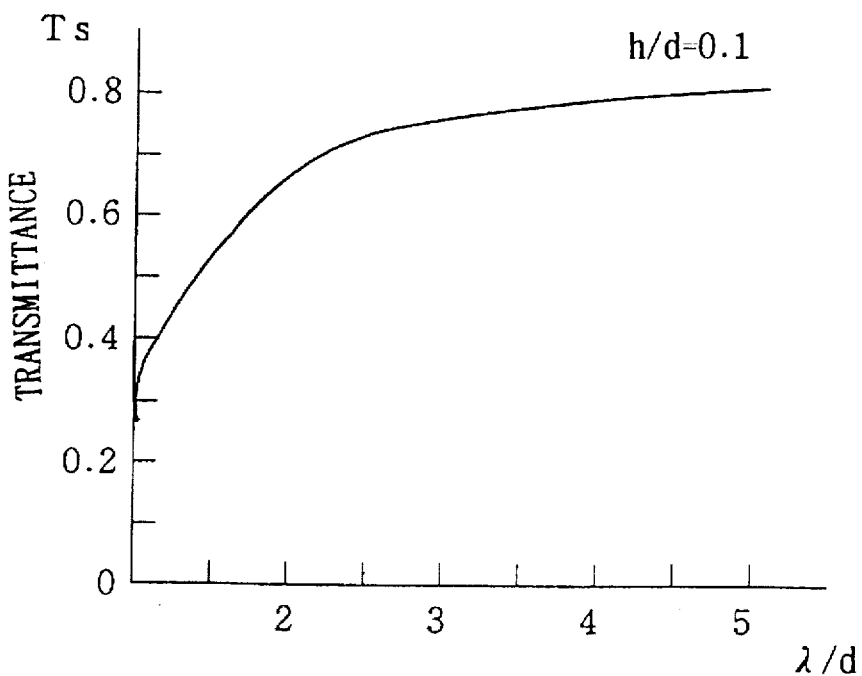
FIGS. 10A and 10B are characteristic curvilinear diagrams showing the characteristics of the S polarization wave transmittance and the S polarization wave reflectance, when h/d=0.1.
Figure 10:
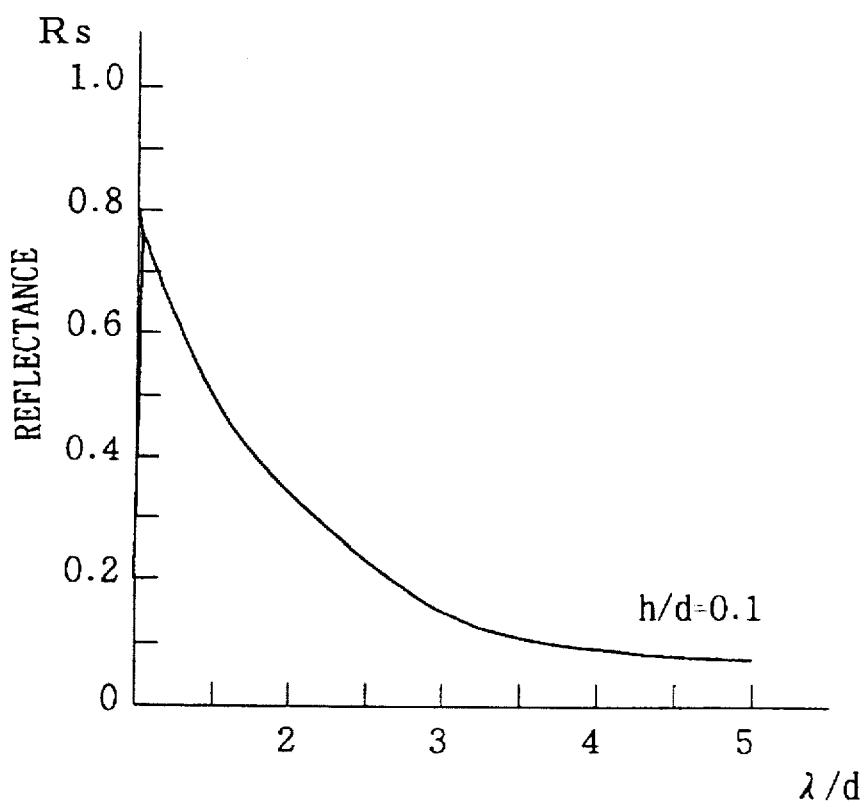

It will be described about an S polarization wave (TM wave). FIGS. 10A and 10B show changes in S polarization transmittance Ts and S polarization reflectance Rs, occurring at h/d=0.1 (a wire thickness "h" is thin), and FIGS. 11A and 11B show that occurring at h/d=0.5 (a wire thickness "h" is thick, and the cross section thereof is square).

Figure 11:
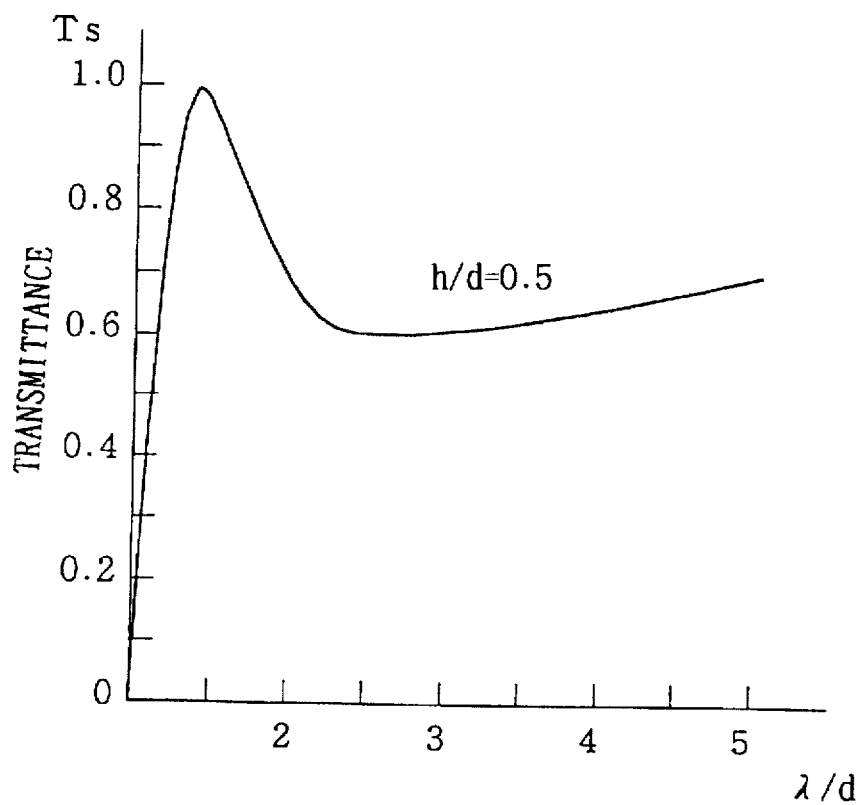
FIGS. 11A and 11B are characteristic curvilinear diagrams showing the characteristics of the S polarization wave transmittance and the S polarization wave reflectance, when h/d=0.5.
Figure 11:
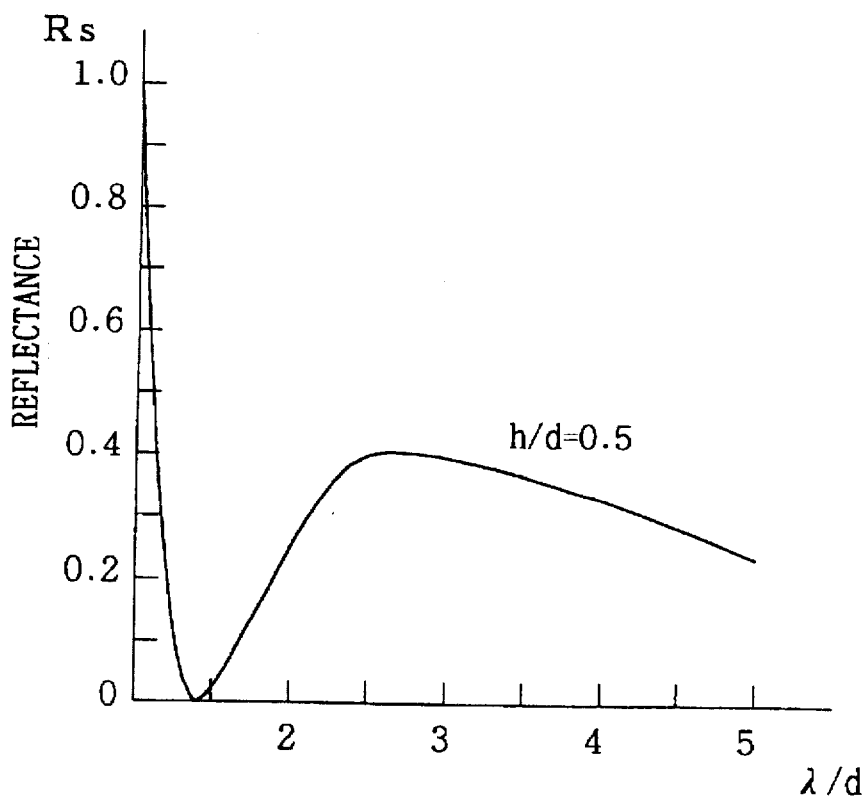

As shown in these figures, the curve at h/d=0.5 in FIG. 11A is more similar to the curve in the modal expansion methods in FIG. 9 than the curve at h/d=0.1 in FIG. 10A. In addition to this, as shown in FIGS. 10A and 10B, as the wire thickness "h" is reduced, the curve is similar to the curve in a conventional theory in FIG. 8. For example, at h/d=0.01 (the wire thickness "h" is ultra-thin), the transmittance is almost same as the curve of FIG. 8.

Figure 13:
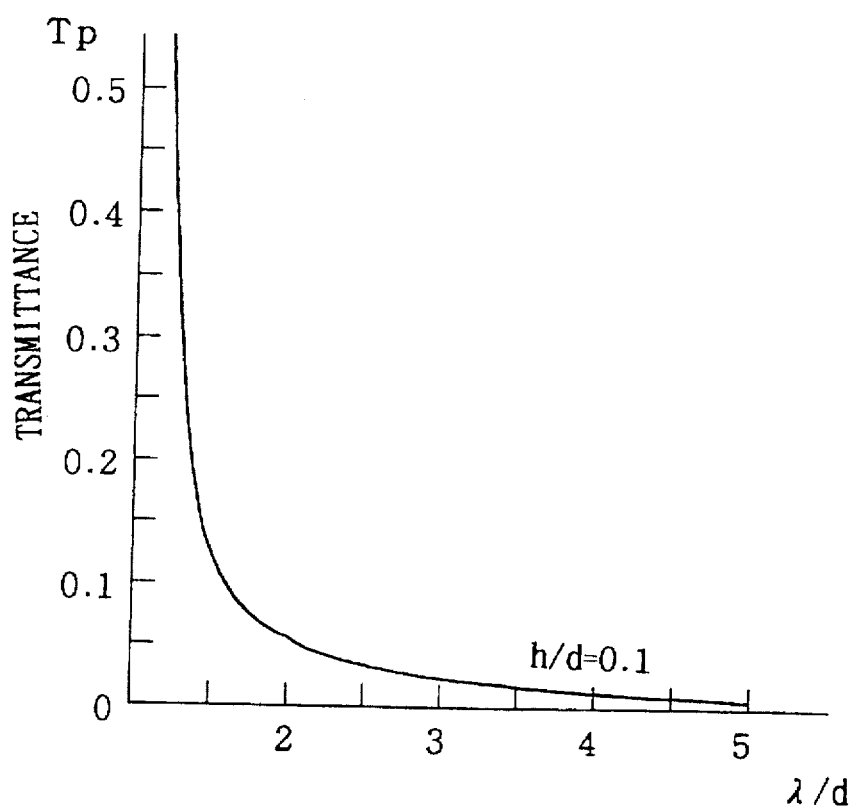
FIGS. 13A and 13B are characteristic curvilinear diagrams showing the characteristics of the P polarization wave transmittance and the P polarization wave reflectance, when h/d=0.1.
Figure 13:
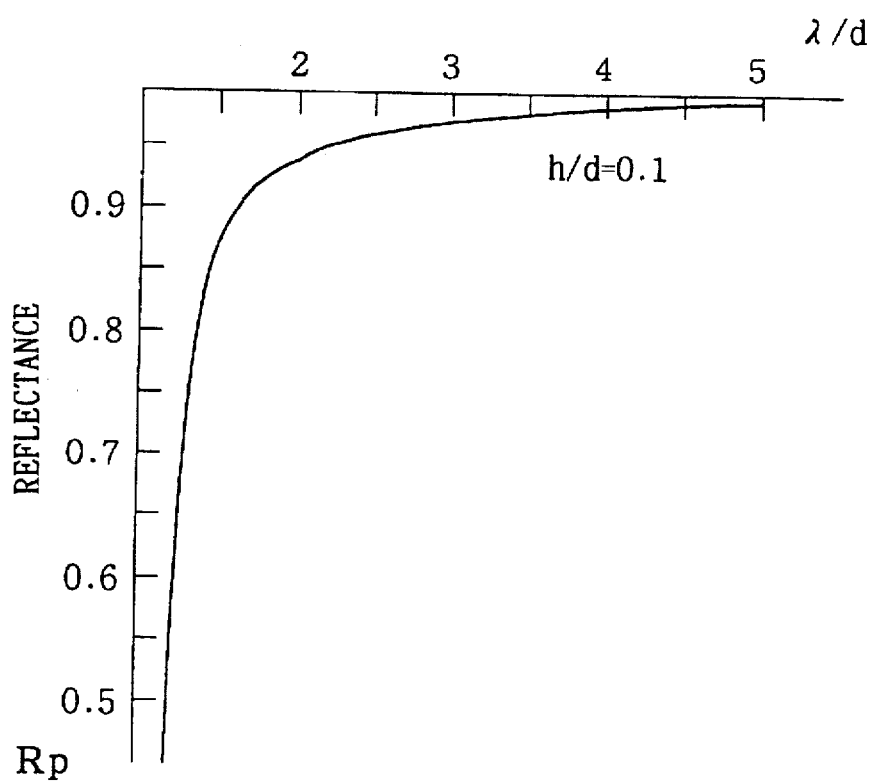
Figure 14:
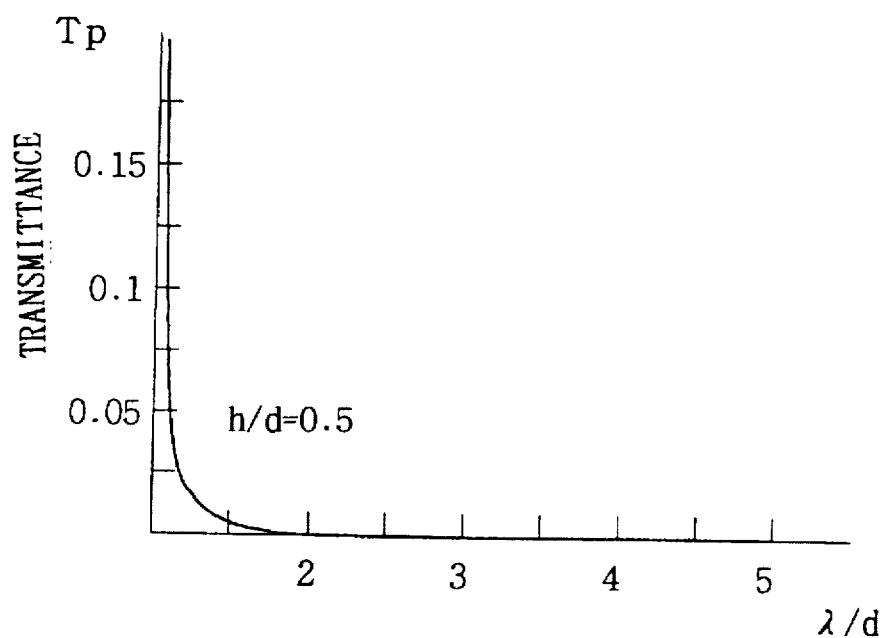
FIGS. 14A and 14B are characteristic curvilinear diagrams showing the characteristics of the P polarization wave transmittance and the P polarization wave reflectance, when h/d=0.5.
Figure 14:
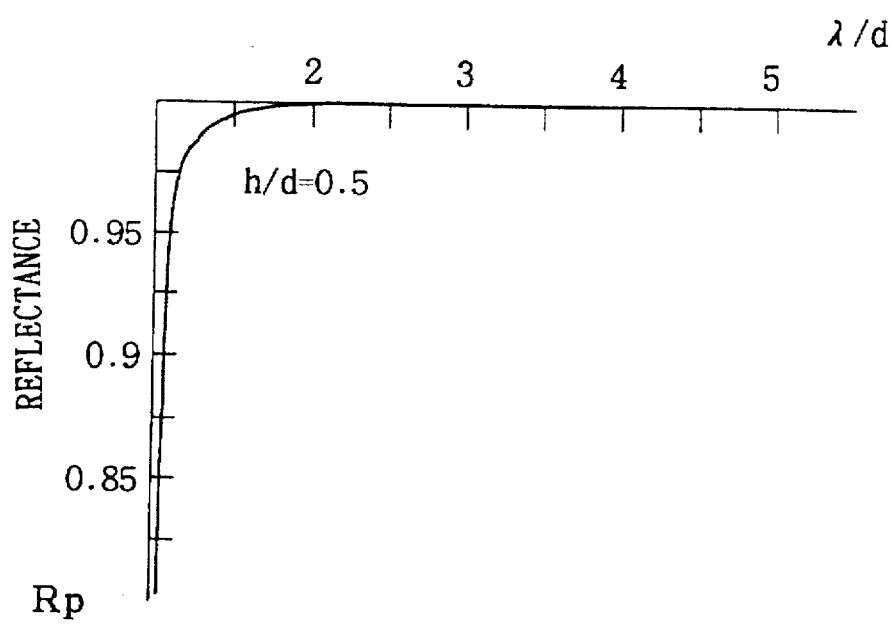

In a P polarization wave (TE wave), as shown in FIGS. 13A and 13B, the P polarization wave transmittance Tp and the P polarization wave reflectance Rp at h/d=0.1 are similar to the curve in a conventional theory in FIG. 8, as in the case of an S polarization wave. On the contrary, as shown in FIGS. 14A and 14B, the P polarization wave transmittance Tp and the P polarization wave reflectance Rp at h/d=0.5 are similar to the curve in the modal expansion methods in FIG. 9.

Considering the case of S polarization wave, FIGS. 13A, 13B, 14A, and 14B show the following which cannot be derived on conventional design theories.

At h/d=0.5 (the cross section of a wire is square), the value of $\lambda/d$ at Ts=1 is in the resonance area where $\lambda/d$ ⁻1.4, and Rp>0.99. Assuming $\lambda$=780 nm, the pitch "d" ⁻550 nm and the wire thickness "h" ⁻275 nm for $\lambda/d$ ⁻1.4, so that it becomes easy in size to produce. That is, the resonance region can be used to evade a conventional problem on production of $\lambda/d \geq 5$.

As described above, conventional design theories hold true of thin wire only. In the above embodiment, however, increasing wire thickness allows the pitch to be increased. Also, it has been found that when wire thickness is reduced, starting at h/d=0.5, the peak value of $\lambda/d$ at which Ts=1 approaches "1", and when wire thickness is further reduced, the extinction ratio Rp/Tp of a P polarization wave is reduced.

(2-3) Feasibility of One-dimensional Metal Grid Analyzer

When the cross section of a one-dimensional metal grid is square (d ⁻550 nm, h ⁻275 nm), the extinction ratio Ts/Rs=∞, and Rp/Tp>200. To solve the problem on production, it is needed to reduce the ratio h/d.

Figure 15:
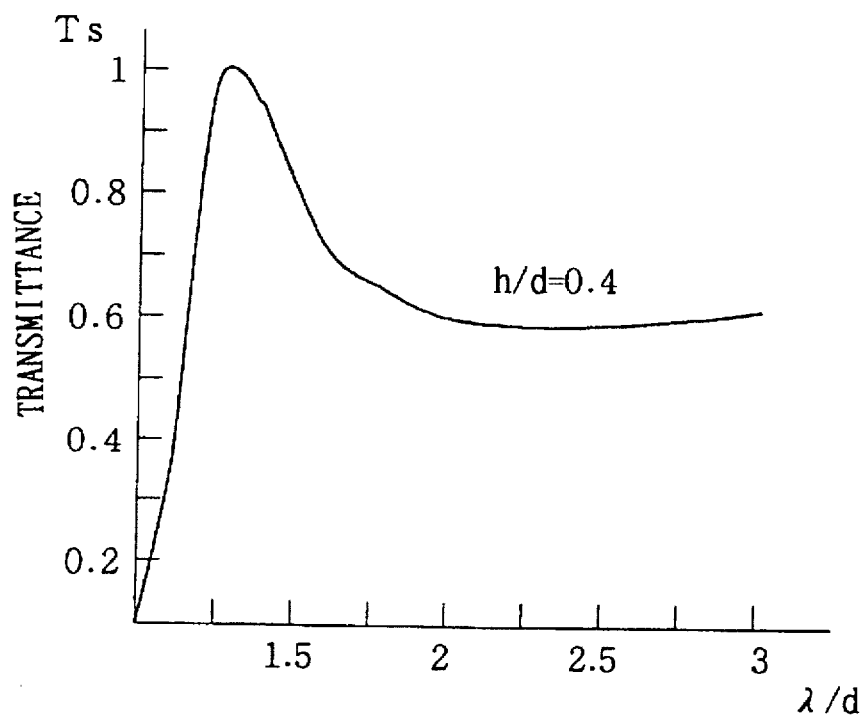
FIGS. 15A and 15B are characteristic curvilinear diagrams showing the characteristics of the S polarization wave transmittance and the P polarization wave reflectance, when h/d=0.4.
Figure 15:
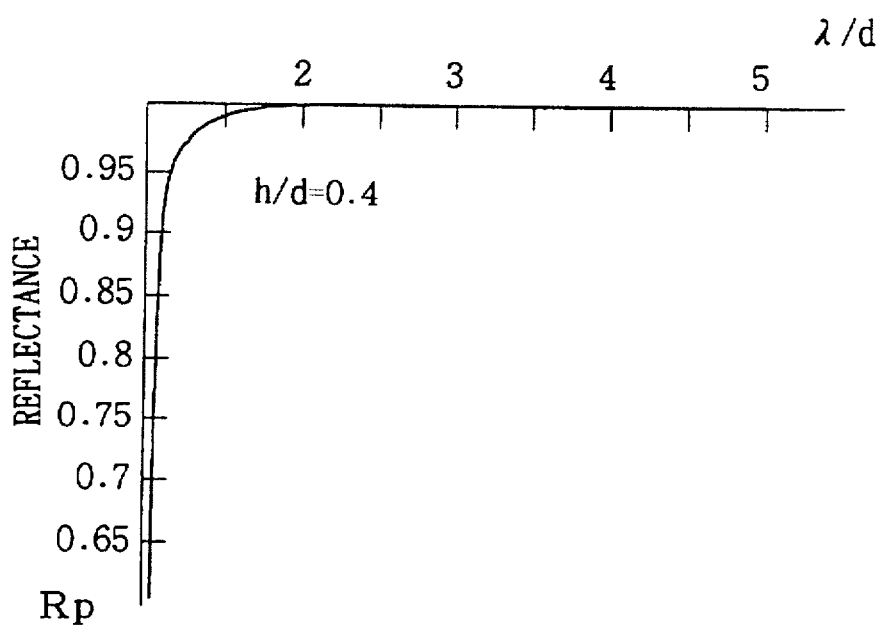

At h/d=0.4 as shown in FIGS. 15A and 15B, Ts/Rs=∞, and Rp/Tp ⁻40 when d=618 nm, and h=247 nm. It is extremely difficult, in general, to produce a wire with the pitch of ⁻0.5

μm or less, that is difficult even with the pitch of 0.5 to 1 μm. The results of tests according to the present invention, however, have shown that a one-dimensional metal grid analyzer offers satisfactory performance under the following conditions:

(1) the light is incided perpendicularly,
(2) the wire is made of perfect conductors,
(3) the cross section of the wire is square, and
(4) the duty factor of the signal is 50%.

Thereby, it was found that a wire grid constant which is easy in process of a one-dimensional metal grid analyzer can be selected.

(3) Coordinate System for One-dimensional Metal Grid in Embodiments

Figure 16:
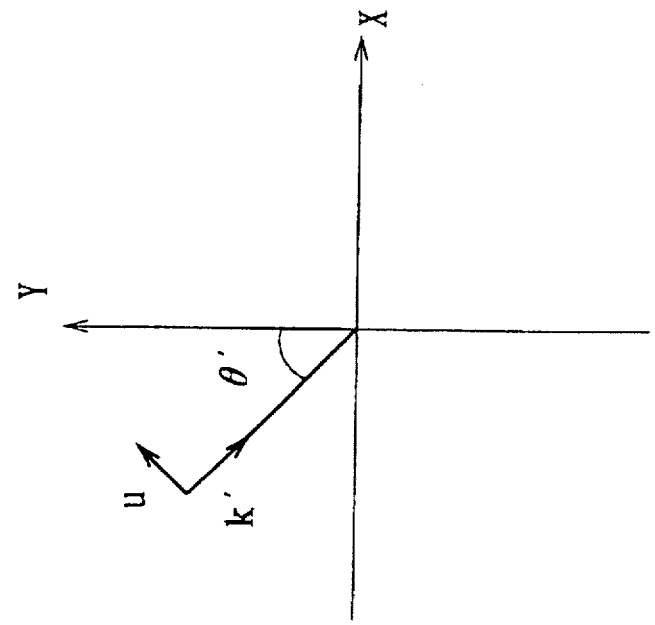
FIGS. 16A and 16B are schematic diagrams showing a coordinate system at a cross section of one-dimensional metal grid.
Figure 16:
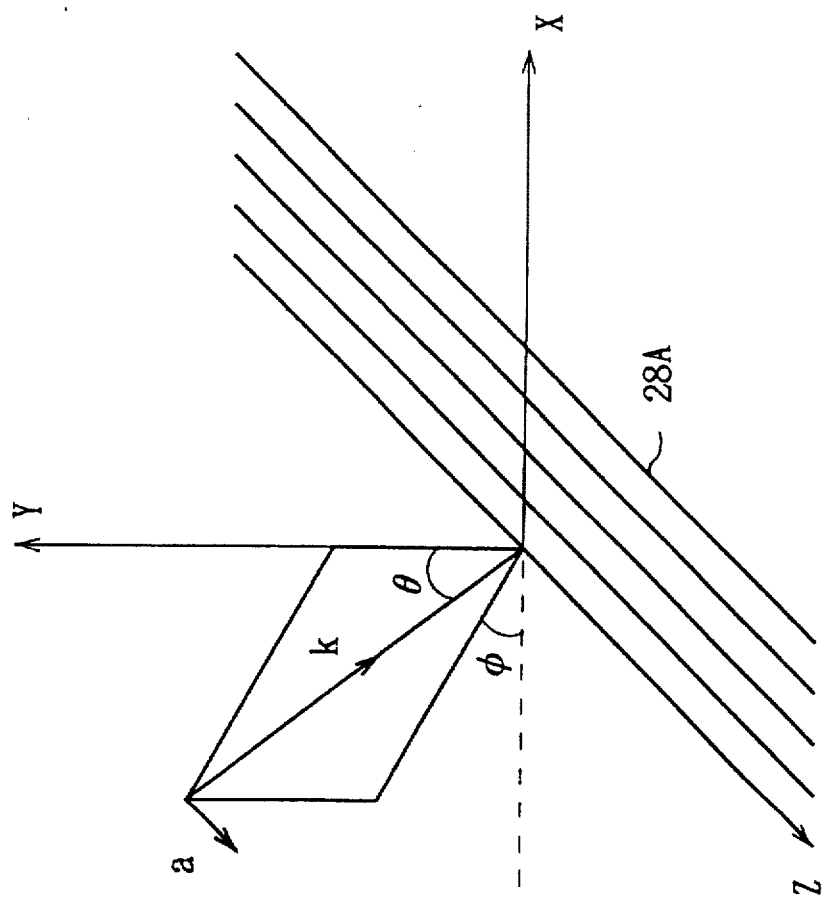

FIGS. 16A and 16B show the relation of one-dimensional metal grid not being perfect conductors to a light beam which is obliquely incident thereon by an orthogonal coordinate system. In Figures, the Z axis is parallel to the wire grid 28, the wave vector of the incident light is represented by k, and the electric field vector of the incident light is represented by a. The components of the k($\alpha$, $\beta$, $\gamma$) are expressed by the following equation:

$$\alpha = k \sin\theta \cos\phi$$
$$\beta = k \cos\theta$$
$$\gamma = k \sin\theta \sin\phi \qquad (3)$$

That k is projected on the X-Y plane is represented by k' and a vector at right angles to k' is represented by u. Assuming an angle of u and a as $\delta$, the transmittance T and the reflectance R are expressed by the following equation:

$$T = Tp \sin^2\delta + Ts \cos^2\delta$$
$$R = Rp \sin^2\delta + Rs \cos^2\delta \qquad (4)$$

where Tp is P polarization wave transmittance, Ts is S polarization wave transmittance, Rp is P polarization wave reflectance, and Rs is S polarization wave reflectance, being projected on a projection chart.

If analyzer requirements are met in the transmittance T and the reflectance R in Equation (4), the transmittance T $^-\cos^2\delta$ and the reflectance R $^-\sin^2\delta$ in accordance with Rp $^-1$, Ts $^-1$, Tp $^-0$, and Rs $^-0$. Forty-five-degree differential wave detection is possible when T=R, that is, when satisfying the following equation:

$$\sin^2\delta = \cos^2\delta$$
$$\text{therefore, } \cos^2\delta = 1/2 \qquad (5)$$

When the electric field of the incident light is represented by a position vector r, the following equation is satisfied:

$$E^i = a \cdot e^{jk \cdot r} \qquad (6)$$

For the optical pickup 11 shown in FIG. 4A, the electric field vector a for an incident polarized light is expressed by the following equation, by using the wave vector k of the incident light and the unit vector y" in the direction of the Y axis:

$$a = \frac{k \times y''}{|k \times y''|} = \frac{(-\gamma, 0, \alpha)}{|(-\gamma, 0, \alpha)|} \qquad (7)$$

where the angle of Kerr rotation is ignored.

Being the angle made by the electric field vector a and the vector u at right angles to a, $\delta$ is expressed by the following equation:

$$\cos^2\delta = \frac{(a \cdot u)^2}{|a|^2 |u|^2} \qquad (8)$$

u($\beta$, $\alpha$, 0) is obtained as u from k'($\alpha$, $-\beta$, 0), thus the following equation is satisfied based on Equation (8):

$$\cos^2\delta = \frac{(\beta\gamma)^2}{(\alpha^2 + \gamma^2)(\alpha^2 + \beta^2)} \qquad (9)$$
$$= \frac{\cos^2\theta \cdot \sin^2\phi}{1 - \sin^2\theta \cdot \sin^2\phi}$$

Equation (5) can be replaced with the following equation:

$$\frac{\cos^2\theta \cdot \sin^2\phi}{1 - \sin^2\theta \cdot \sin^2\phi} = \frac{1}{2} \qquad (10)$$

Thus, the relation as the following equation can be obtained:

$$\tan^2\phi = \frac{1}{\cos^2\theta} \qquad (11)$$

When it is assumed that an incidental angles $\theta$ to a wire surface is $0° \leq \theta < 90°$ and $\phi$ is $-90° < \phi \leq 90°$, Equation (11) is expressed by the following equation:

$$\tan\phi = \pm \frac{1}{\cos\theta} \qquad (12)$$

A vector k' which is necessary for obtaining Tp, Ts, Rp, and Rs in projection is expressed by the following equation:

$$k' = \sqrt{k^2 - \gamma^2} = k\sqrt{1 - \sin^2\theta \cdot \sin^2\phi} \qquad (13)$$
$$= \frac{2\pi}{\frac{\lambda_0}{\sqrt{1 - \sin^2\theta \cdot \sin^2\phi}}} = \frac{2\pi}{\lambda}$$

Thus the wavelength $\lambda'$ of the optical components vertically crossing to the wire grid is expressed by the following equation:

$$\lambda' = \frac{\lambda_0}{\sqrt{1 - \sin^2\theta \cdot \sin^2\phi}} \qquad (14)$$

From this, the following equation is obtained:

$$\sin\theta' = \frac{\sin\theta \cdot \cos\phi}{\sqrt{1 - \sin^2\theta \cdot \sin^2\phi}} \quad \left(= \frac{\alpha}{k'}\right) \qquad (15)$$

It will be hereinafter described that an embodiment of the arrangement of the one-dimensional metal grid 28 and detection of the magneto-optical signal.

Figure 17:
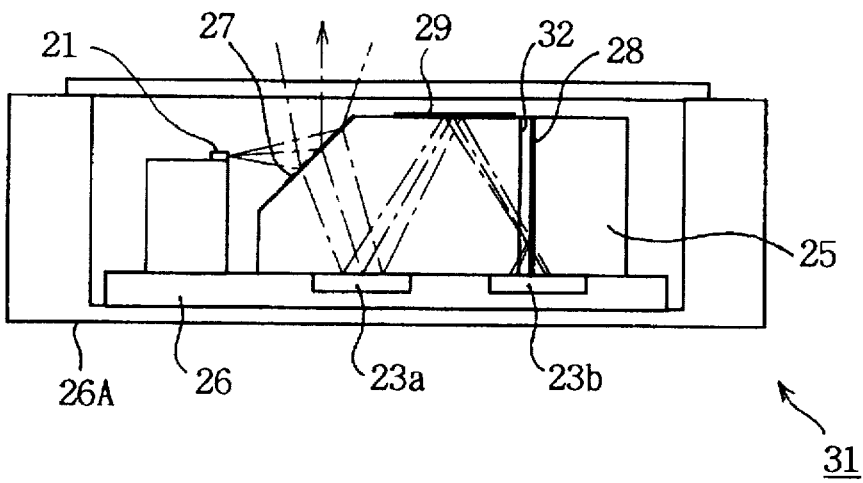
FIGS. 17A and 17B are schematic diagrams showing the arrangement of the optical pickup in the embodiments.
Figure 17:
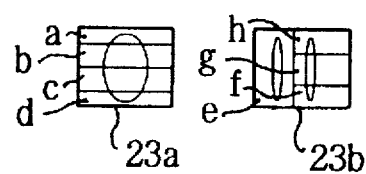

In FIGS. 17A and 17B, corresponding parts to those of FIG. 4A are denoted by the same numerals. FIG. 17A generally shows an optical pickup 31 according to a first embodiment in which a one-dimensional metal grid 28 and a half-wavelength plate 32 are placed inside the optical wave director 25 in the lengthwise direction, so as to be orthogonal with photodetectors 23a and 23b.

Figure 18:
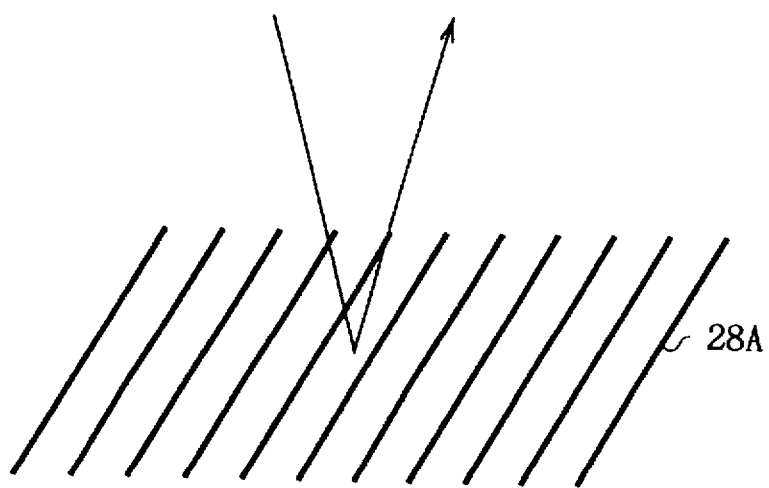
FIG. 18 is a schematic diagram showing the relation between the angle of incidence and the one-dimensional metal grid in the embodiments.

As shown in FIG. 18, the wire 28A is placed so as to be $\phi = 0$ and vary $\theta$ in the relation between the one-dimensional metal grid 28 and the incident light thereto in the optical pickup 31.

In this embodiment, the optical pickup 31 comprises a light source 21, an optical wave director 25, and two photodetectors 23a, 23b, which are supported by a support 26. A beam splitter film 27 is disposed on the incident light irradiated surface of the optical wave director 25 in the optical pickup 31. The light beams incident from the beam splitter film 27 are irradiated to the photodetector 23a provided on a board 26 through the optical wave director 25, and the reflected light beam is incided to a total reflection film 29 facing to the board 26. The total-reflected light beam is passed through a half-wavelength plate 32 which is arranged in the lengthwise direction, and incident to the one-dimensional metal grid 28 piled up on the half-wavelength plate 32. The transmitted light component and the reflected light component are incident to the photodetector 23b on the board 26.

The photodetector 23a is divided into four regions a, b, c, and d as in FIG. 4B. The photodetector 23b is divided into four regions, a region "e" where the light reflected by the one-dimensional metal grid 28 is received and three regions "f, g, h" which receive the light transmitted through the one-dimensional metal grid 28.

In the case where θ is varied at the state where the wire 28A is placed so as to be φ=0, the transmitted light and reflected light from the wire 28A are composed only of 0th degree light when the following equations are satisfied, it will be described in detail in the clause of the modal expansion methods):

$$\alpha_n = k \sin\theta' + n \frac{2\pi}{d} \quad (16)$$

$$k^2 \leq \alpha_{\pm 1}^2 \quad (17)$$

$$1 \leq \left( \sin\theta \pm \frac{\lambda_0}{d} \right)^2 \quad (18)$$

From $0° \leq \theta < 90°$, and $\lambda_0/d > 0$, the following equation is obtained:

$$d \leq \lambda_0 \frac{1}{1+\sin\theta} \quad (19)$$

Figure 19:
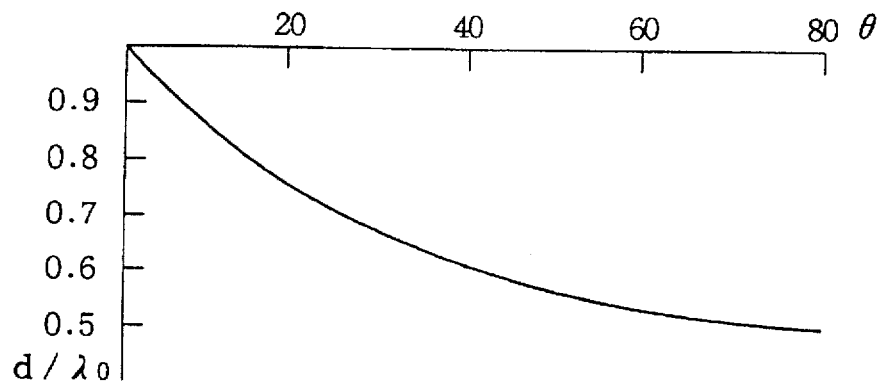
FIG. 19 is a characteristic curvilinear diagram showing the characteristics of the ratio $d/\lambda_0$ in the embodiments.

FIG. 19 shows the relation of the angle of incidence θ to $\lambda_0/d$. The one-dimensional metal grid 28 serves as an analyzer, thereby separating the incident light into a transmitted light and a reflected light, depending on the direction of polarization. As the angle of incidence λ on the wire surface is increased (FIGS. 16A and 16B), the range of the pitch "d" shown by Equation (19) shifts to smaller.

According to the above-described arrangement, the one-dimensional metal grid 28 whose pitch "d" is less than $\lambda_0/(1+\sin\theta)$ is provided in the lengthwise direction together with the half-wavelength plate 32 in the optical wave director 25 of the optical pickup 31, so that the direction of polarization of the incident light is rotated by 45° by the half-wavelength plate 32 to perform 45° differential wave detection. Therefore, in such arrangement of the wire 28A of the one-dimensional metal grid 28 that the incident light is incided at φ=0 as shown in FIG. 18, a smaller and more reliable optical pickup 31 for optical recording medium can be realized.

In the case of the embodiment of FIGS. 17A and 17B, the incident light successively reflected at the photodetector 23a and the total reflection film 29 is incided to the half-wavelength plate 32 and the one-dimensional metal grid 28 arranged in the direction to be orthogonal with the photodetectors 23a and 23b. However, instead of this, using of the optical pickup having the construction of FIGS. 20A and 20B brings the same effects as the embodiment of FIGS. 17A and 17B.

Figure 20:
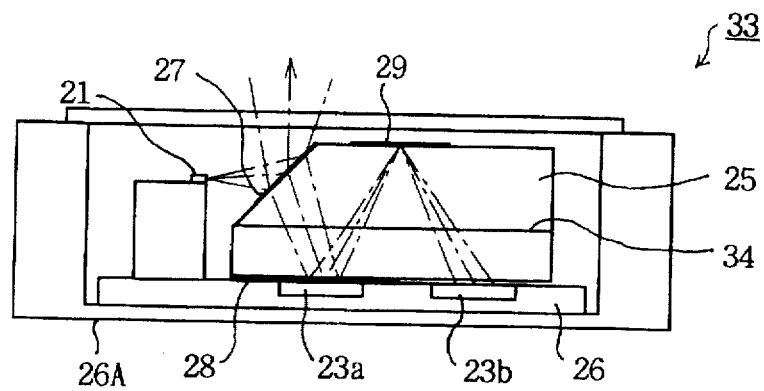
FIGS. 20A and 20B are schematic diagrams showing the relation between the angle of incidence and the one-dimensional metal grid in the embodiments.
Figure 20:
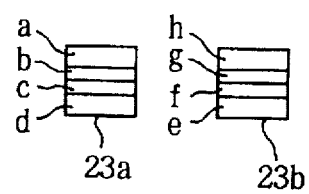

In this connection, in the optical pickup 33 of FIGS. 20A and 20B, the incident light is incided to the photodetectors 23a and 23b through the half-wavelength plate 34 which is faced to the photodetectors 23a and 23b on the board 26 and the one-dimensional metal grid 28 which is inserted between the half-wavelength plate 34 and the photodetector 23a. 0042

In the above example of the arrangement of the one-dimensional metal grid 28, the angle of incidence θ on the wire surface is increased so that the range of the pitch "d", shown by Equation (19), is shifted to smaller. Hereinafter, it will be described that the case where the range of the pitch "d" is shifted to larger, on the contrary to that.

Figure 21:
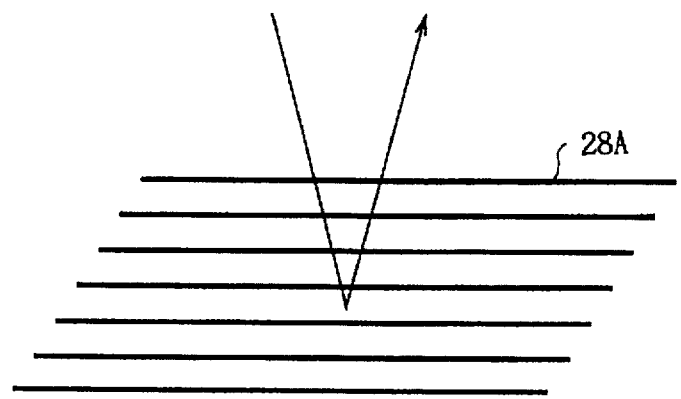
FIG. 21 is a schematic diagram showing another relation between the angle of incidence and the one-dimensional metal grid in the embodiments.

In this case, the wire 28A is placed so as to be φ=90° as shown in FIG. 21, as the one-dimensional metal grid 28 of the optical pickup 31 shown in FIGS. 17A and 17B, and the optical pickup 32 shown in FIGS. 20A and 20B.

As shown in FIG. 21, in the case where the wire 28A of the one-dimensional metal grid 28 is placed so as to be φ=90°, and θ is varied, the following equation is obtained from Equation (20) under the condition of θ'=0, φ=90°:

$$d \leq \lambda' = \frac{\lambda_0}{\sqrt{1 - \sin^2\theta \cdot \sin^2\theta}} \quad (20)$$

$$= \frac{\lambda_0}{\sqrt{1 - \sin^2\theta}} = \lambda_0 \cdot \frac{1}{\cos\theta}$$

Figure 22:
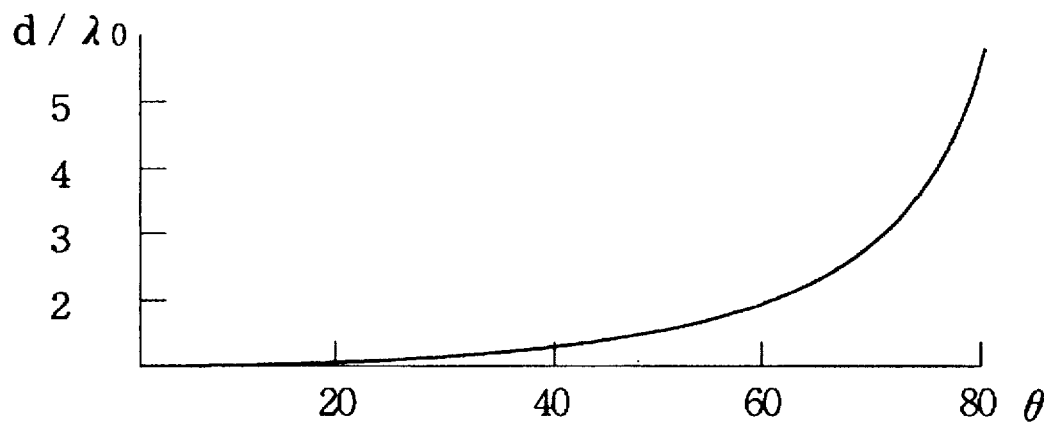
FIG. 22 is a characteristic curvilinear diagram showing the characteristics of the ratio $d/\lambda_0$ in FIG. 21.

The relation of the angle of incidence θ to $\lambda_0/d$ is shown in FIG. 22. As found from FIG. 22, in the embodiment of FIG. 21, as the angle of incidence θ on the wire surface is increased, the range of the pitch "d" in Equation (26) shifts to larger.

According to the arrangement of FIGS. 17A, 17B, 20A, 20B, and 21, the one-dimensional metal grid 28 whose pitch "d" is less than $\lambda_0/\cos\theta$ is disposed lengthwise or transversally together with half-wavelength plates 32 and 34, so as to perform 45° differential wave detection, thereby, a smaller and more reliable optical pickup for optical recording medium can be accomplished.

Figure 23:
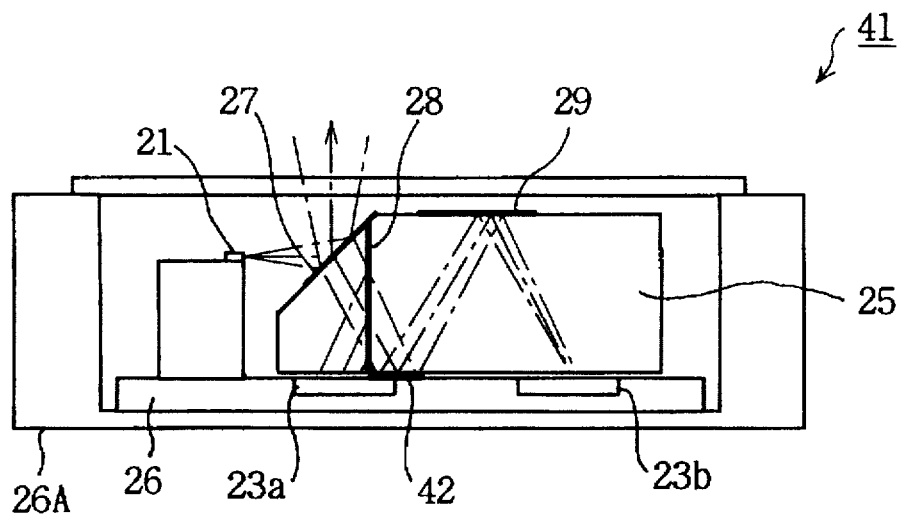
FIGS. 23A and 23B are schematic diagrams showing other arrangement of the optical pickup.
Figure 23:
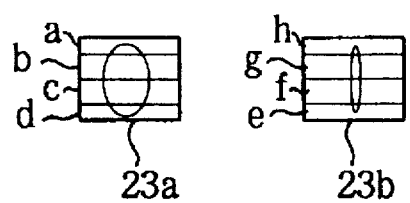

Next, it will be described that the construction of an optical pickup 41 not requiring half-wavelength plate. In the optical pickup 41, as shown in FIGS. 23A and 23B, the light beams passed through the beam splitter 27 is incided to the one-dimensional metal grid 28 placed lengthwise direction. The photodetector 23a is disposed in the region irradiated with the reflected light beams of the one-dimensional metal grid 28, and also a total reflection film 42 is placed in a region irradiated with transmitted light beams. Therefore, the light beams reflected by the total reflection film 42 is incided to the photodetector 23b after being reflected by the total reflection film 29.

In this case, the photodetector 23a is divided into four regions "a", "b", "c", and "d" as in FIG. 20B. The photodetector 23b is divided into four regions "e", "f", "g", and "h" as the photodetector 23a.

In the case of the one-dimensional metal grid 28 of this embodiment, 45° differential wave detection can be implemented without using a half-wavelength plate if the wire 28A is placed so as to satisfy the following equation:

$$\tan\phi = \pm \frac{1}{\cos\theta} \quad (21)$$

By using Equations (14) and (15), the following equation can be obtained:

$$d \leq \lambda \cdot \frac{1}{1+\sin\theta'} \quad (22)$$

$$= \frac{\lambda_0}{\sqrt{1-\sin^2\theta \cdot \sin^2\phi}} \cdot \frac{1}{1+\frac{\sin\theta \cdot \cos\phi}{\sqrt{-\sin^2\theta \cdot \sin^2\phi}}}$$

$$= \lambda_0 \cdot \frac{1}{\sqrt{1-\sin^2\theta \cdot \sin^2 + \sin\theta \cdot \cos\phi}}$$

$\sin^2\phi$ and $\cos\phi$ in Equation (22) are given by the following equation:

$$\sin^2\phi = \frac{1}{1+\frac{1}{\tan^2\phi}} = \frac{1}{1+\cos^2\theta} \quad (23)$$

$$\cos\phi = \sqrt{\frac{\sin^2\phi}{\tan^2\phi}} = \frac{\cos\theta}{\sqrt{1+\cos^2\theta}}$$

$(\because -90° < \phi \leq 90°)$

Substituting Equation (23) into Equation (22), the following equation can be obtained:

$$d \leq \lambda_0 \frac{1}{\sqrt{1-\sin^2\theta \cdot \frac{1}{1+\cos^2\theta}} + \sin\theta \cdot \frac{\cos\theta}{\sqrt{1+\cos^2\theta}}} = \quad (24)$$

$$\lambda_0 \frac{\sqrt{1+\cos^2\theta}}{\cos\theta(\sqrt{2}+\sin\theta)}$$

Figure 25:
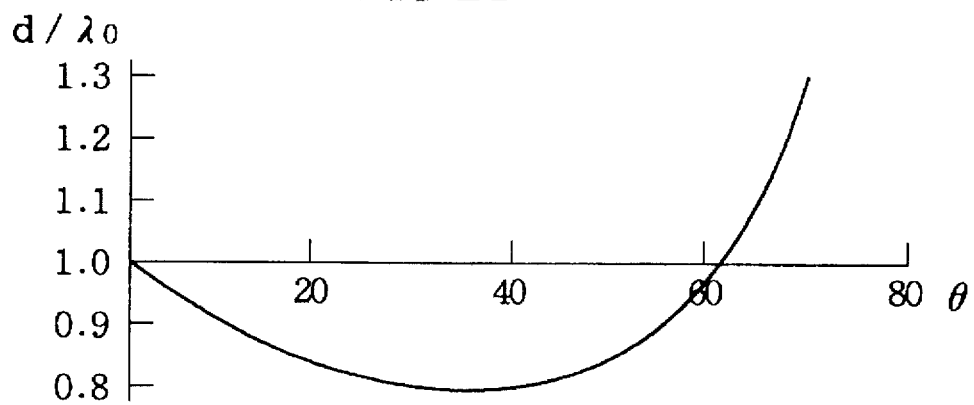
FIG. 25 is a characteristic curvilinear diagram showing the characteristics of the ratio $d/\lambda_0$ in FIG. 24.

$d/\lambda_0$ expressed by the following equation varies as shown in FIG. 25:

$$d/\lambda_0 = \frac{\sqrt{1+\cos^2\theta}}{\cos\theta(\sqrt{2}+\sin\theta)} \quad (25)$$

Substituting 60° or more for θ in the equation giving $d/\lambda_0$ allows more advantageous detection.

According to the above-described arrangement, the one-dimensional metal grid 28 whose pitch "d" satisfies Equation (25) is disposed transversally to the optical wave director 25 of the optical pickup 41, so that 45° differential wave detection can be implemented without using the half-wavelength plate and a smaller and more reliable optical pickup for optical recording medium can be realized.

Figure 24:
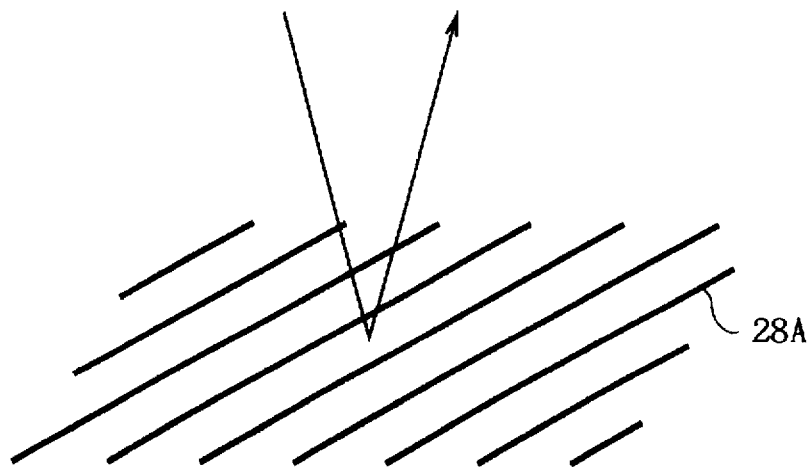
FIG. 24 is a schematic diagram showing the relation between incident light and one-dimensional metal grid.

In the case of the embodiment of FIGS. 23A and 23B, by inciding the incident light passed through the beam splitter film 27 to the one-dimensional metal grid 28 with the relation of FIG. 24 (φ=0°, 90°), the reflection light is incided to one photodetector 23a and the transmitted light is successively reflected at the total reflection films 42 and 29 to be incided to the other photodetector 23b. However, instead of this construction, the case of FIGS. 26A and 26B can obtain the same effects as the case of the embodiment of FIGS. 23A and 23B.

Figure 26:
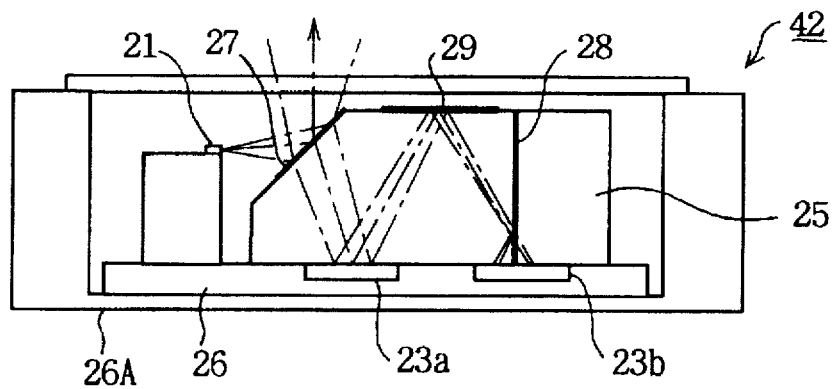
FIGS. 26A and 26B are schematic diagrams showing other arrangement of the optical pickup.
Figure 26:
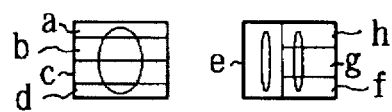

In this connection, the optical pickup 42 in FIGS. 26A and 26B successively reflects the incident light passed through the beam splitter film 27 at one photodetector 23a and the total reflection film 29 to incide to the one-dimensional metal grid 28 which is provided lengthwise. Then, the transmitted light obtained from the one-dimensional metal grid 28 is incided to three divided regions "f", "g", and "h" of the other photodetector 23b and the reflection light is incided to one divided region "e".

(4) Modal Expansion Methods

Now the modal expansion methods used in the above embodiment will be described. The modal expansion methods, applied to diffraction grating of a special shape, such as a rectangular shape, is known to readily provide results. The methods use the technique that modal expansion in a groove and Rayleigh expansion outside the groove are matched with each other. The expansion methods is specifically described regarding the one-dimensional metal grid (perfect conductors) 28 shown in FIG. 7.

Let f (x, y) be the space-dependent component of the Z-axis component of a magnetic field (S mode) or an electric field (P mode), which space-dependent component undergoes Rayleigh expansion into a plane wave above and under metal ($y \geq h/2$, $y \leq -h/2$).

Regarding the expansion above the metal ($y \geq h/2$) and under the metal ($y \leq -h/2$), the following equations are satisfied:

$$f(x,y) = \sum_{n=-\infty}^{\infty} \{R_n \exp[i\chi_n(y-h/2)] + \quad (26)$$
$$\delta_{n,0}\exp[-i\chi_0(y-h/2)]\}\exp(\alpha_n x),$$
for $y \geq h/2$ $$f(x,y) = \sum_{n=-\infty}^{\infty} T_n\exp\{R_n\exp[i\chi_n(y-h/2)] + \quad (27)$$
$$\delta_{n,0}\exp[-i\chi_0(y-h/2)]\}\exp(\alpha_n x), \text{ for } y \geq h/2$$

$$\alpha_n = \alpha_0 + n(2\pi/d) \quad (28)$$
$$\alpha_0 = k_0\sin\theta_0$$
$$k_0 = \omega/c = 2\pi/\lambda$$

$$\chi_n = \begin{cases} (k_0^2 - \alpha_n^2)^{1/2} & |k_0| \geq |\alpha_n| \\ i(\alpha_n^2 - k_0^2)^{1/2} & |k_0| \leq |\alpha_n| \end{cases} \quad (29)$$

where Rn and Tn are complex amplitudes of reflected light and transmitted light.

Solving the Helmholtz equation $\Delta f + k^2 f = 0$ so that a Neumann boundary condition $\partial f/\partial n' = 0$ (n' represents a surface normal vector) (S mode) or a Dirichlet boundary condition f=0 (P mode) is satisfied in intervals $0 \leq x \leq c$ and $-h \leq y \leq h/2$ yields $$f(x,y) = \sum_{m=0}^{\infty} \phi_m(x,y) \quad (30)$$

$$\phi_m(x,y)=\cos(\beta_m x)[a_m\sin(\mu_m y)+b_m\cos(\mu_m y)], S \text{ modes} \quad (31)$$

$$\phi_m(x,y)=\sin(\beta_m x)[a_m\sin(\mu_m y)+b_m\cos(\mu_m y)], P \text{ modes} \quad (32)$$

where $\beta_m = m\pi/c$, $\mu_m = +(k_0^2-\beta_m^2)^{1/2}$, and $a_m$ and $b_m$ are complex amplitudes. In the P mode, $\phi_0=0$, and $m \geq 1$.

Solving the Helmholtz equation on matching condition that f (x, y) and $\partial f/\partial y$ are continuous on the interval $0 \leq x \leq c$ and at $y=\pm h/2$ yields the following equations when y=h/2:

$$\sum_n (R_n + \delta_{n,0})\exp(i\alpha_n x) = \sum_n (\bar{a}_m + \bar{b}_m)u_m(x) \quad (33)$$

$$i\sum_n (R_n - \delta_{n,0})\exp(i\alpha_n x) = \sum_n (D_{1m}\bar{a}_m + D_{2m}\bar{b}_m)u_m(x) \quad (34)$$

When y=−h/2

$$\sum_n T_n\exp(i\alpha_n x) = \sum_m (-\bar{a}_m + \bar{b}_m)u_m(x) \quad (35)$$

$$-i\sum_n \chi_n T_n\exp(i\alpha_n x) = \sum_m (D_{1m}\bar{a}_m - D_{2m}\bar{b}_m)u_m(x) \quad (36)$$

Thus, $$\bar{a}_m = a_m\sin(\mu_m h/2)$$

$$\bar{b}_m = b_m \cos(\mu_m h/2)$$

$$D_{1m} = \mu_m \cot(\mu_m h/2)$$

$$D_{2m} = -\mu_m \tan(\mu_m h/2) \tag{37}$$

$$u_m(x) = \begin{cases} \cos(\beta_m x) & S\text{-modes} \\ \sin(\beta_m x) & P\text{-modes} \end{cases} \tag{38}$$

Now an S polarization wave is described. Equations (33) and (35) hold in the interval $0 \leq x \leq c$. In the interval, vectors represented by the equation $\mu_m(x) = \cos(\beta_m x)$ are at right angles to each other. Thus multiplying Equations (33) and (35) by $\mu_j(x)$, using $$I_{m,j} = \int_0^c u_m(x) u_j(x) dx = I_m \delta_{m,j} \tag{39}$$

$$I_m = \begin{cases} c & (m=0) \\ c/2 & (m \geq 1) \end{cases}$$

and integrating the expressions over the interval $0 \leq x \leq c$ give $$(\bar{a}_j + \bar{b}_j) I_j = \sum_n k_{j,n}(R_n + \delta_{n,0}) \tag{40}$$

$$(-\bar{a}_j + \bar{b}_j) I_j = \sum_n k_{j,n} T_n \tag{41}$$

$$K_{j,n} = \int_0^c \exp(i\alpha_n x) u_j(x) dx \tag{42}$$

Since "f" satisfies the Neumann boundary condition $\partial f/\partial n = 0$ even when $c \leq x \leq d$ and $y = \pm h/2$, $$i \sum_n x_n (R_n - \delta_{n,0}) \exp(i\alpha_n x) = 0 \tag{43}$$

$$i \sum_n x_n T_n \exp(i\alpha_n x) = 0 \tag{44}$$

Equations (34) and (43) hold in the interval $0 \leq x \leq c$ and an interval $c \leq x \leq d$, respectively. Thus Equations (34) and (43) are multiplied by $\exp(-i\alpha_u x)$, integrated over the intervals $0 \leq x \leq c$ and $c \leq x \leq b$, respectively, and added to each other. As a result, the orthogonality of $\exp(-i\alpha_u x)$ gives $$ix_q(R_q - \delta_{q,0}) = \sum_m J_{q,m}(D_{1m}\bar{a}_m + D_{2m}\bar{b}_m) \tag{45}$$

$$J_{q,m} = \frac{1}{d} \int_0^c \exp(-i\alpha_q x) u_m(x) dx \tag{46}$$

Similarly, from Equations (36) and (44)

$$ix_q T_q = -\sum_n J_{q,m}(D_{1m}\bar{a}_m - D_{2m}\bar{b}_m) \tag{47}$$

Equations (40), (41), (45), and (47) are solved as simultaneous equations, containing four unknowns. To solve the equations for Rn and Tn, they are reduced to $$R_n + T_n \equiv P_n, \quad R_n - T_n \equiv M_n \tag{48}$$

Adding Equation (40) to Equation (41) and subtracting Equation (41) from Equation (40) yield $$\bar{a}_i = \frac{1}{2I_i} \sum_n k_{in}(M_n + \delta_{n,0}) \tag{49}$$

$$\bar{b}_i = \frac{1}{2I_i} \sum_n k_{in}(P_n + \delta_{n,0}) \tag{50}$$

Adding Equation (45) to Equation (47) and subtracting Equation (47) from Equation (45) yield $$ix_q(P_q - \delta_{q,0}) = \sum_m J_{q,m} \cdot 2D_{2m}\bar{b}_m \tag{51}$$

$$ix_q(M_q - \delta_{q,0}) = \sum_m J_{q,m} \cdot 2D_{1m}\bar{a}_m \tag{52}$$

Substituting Equations (49) and (50) into Equations (51) and (52) yields $$ix_q(P_q - \delta_{q,0}) = \sum_m J_{q,m} \frac{D_{2m}}{I_m} \sum_n K_{m,n}(P_n + \delta_{n,0}) \tag{53}$$

$$ix_q(M_q - \delta_{q,0}) = \sum_m J_{q,m} \frac{D_{1m}}{I_m} \sum_n K_{m,n}(M_n + \delta_{n,0}) \tag{54}$$

These are expressed by a matrix as follows:

$$\begin{pmatrix} ix_{-n} & 0 & \cdots & & \cdots & 0 \\ 0 & \ddots & & & & \vdots \\ \vdots & & \ddots & & & \vdots \\ \vdots & & & ix_0 & & \vdots \\ \vdots & & & & \ddots & \vdots \\ \vdots & & & & & \ddots & 0 \\ 0 & \cdots & \cdots & \cdots & 0 & ix_n \end{pmatrix} \left\{ \begin{pmatrix} P_{-n} \\ \vdots \\ \vdots \\ P_0 \\ \vdots \\ \vdots \\ P_n \end{pmatrix} - \begin{pmatrix} 0 \\ \vdots \\ 0 \\ 1 \\ 0 \\ \vdots \\ 0 \end{pmatrix} \right\} \tag{55}$$

$$= \begin{pmatrix} J_{-n,0} & \cdots & J_{-n,m} \\ \vdots & & \vdots \\ \vdots & & \vdots \\ J_{n,0} & \cdots & J_{n,m} \end{pmatrix} \begin{pmatrix} D_{20}/I_0 & 0 & \cdots & \cdots & 0 \\ 0 & \ddots & & & \vdots \\ \vdots & & \ddots & & \vdots \\ \vdots & & & \ddots & 0 \\ 0 & \cdots & \cdots & 0 & D_{2m}/I_m \end{pmatrix} \begin{pmatrix} K_{0,-n} & \cdots & K_{0,n} \\ \vdots & & \vdots \\ \vdots & & \vdots \\ K_{m,-n} & \cdots & K_{m,n} \end{pmatrix}$$

$$\left\{ \begin{pmatrix} P_{-n} & 0 \\ \vdots & \vdots \\ \vdots & 0 \\ P_0 & +1 \\ \vdots & 0 \\ \vdots & \vdots \end{pmatrix} \right\}$$

This matrix is abbreviated as $$iX(P-\delta)=J(D/I)_2K(P+\delta) \quad (56)$$

Thus, $$P=[iX-J(D/I)_2K]^{-1}[iX+J(D/I)_2K]\delta \quad (57)$$

Similarly, $$M=[iX-J(D/I)_1K]^{-1}[iX+J(D/I)_1K]\delta \quad (58)$$

In the same way as described above, the following are obtained for a P polarization wave:

$$P=[J(1/DI)_2KiX-E]^{-1}[J(1/DI)_2KiX+E]\delta \quad (59)$$

$$M=[J(1/DI)_1KiX-E]^{-1}[J(1/DI)_1KiX+E]\delta \quad (60)$$

(5) Other Embodiments

While the invention has been described in embodiments, wherein a one-dimensional metal grid composed of perfect conductors is used, it should be understood that the invention is not limited thereto but may be embodied using a one-dimensional metal grid composed of non-perfect conductors if the conductors provide the grating with satisfactory analyzer performance.

Although the invention has also been described in embodiments, wherein a beam splitter film is placed on an incident light irradiated surface of a wave director, it should be understood that the invention is not limited thereto but may be embodied by placing a polarization beam splitter in front of a one-dimensional metal grid, which splitter with a P wave transmittance Tp of 100 and an Ts Wave transmittance of 25, for example, has enhancing function.

While the invention has further been described in embodiments, wherein an optical pickup records information on a magneto-optical disc and reproduces it therefrom, it should be understood that the invention is not limited thereto but may be embodied using an optical pickup which records information on an optical card and reproduces it therefrom.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical pickup comprising:

a laser light source emitting a light beam;

an objective lens for focusing a light beam emitted from said laser light source on the data recording surface of an optical recording medium;

light receiving means for receiving a returned light from said optical recording medium;

light beam splitting means for splitting said returned light from said optical recording medium, from the emitted light from said laser light source; and a wire grid unit positioned between, at least, a part of said light receiving means and said light beam splitting means, for transmitting a first polarization component in the light beam and reflecting a second polarization component, wherein said wire grid unit is formed so that the ratio h/d of a pitch "d" to the thickness "h" of metal conductor constituting a wire is approximately 0.1 or more.

2. The optical pickup according to claim 1, wherein a half-wavelength plate is positioned between said light beam splitting means and said wire grid unit.

3. The optical pickup according to claim 2, wherein:

said wire grid unit is positioned so that a main light is incident to a plane which is normal to the plane formed by said wire grid unit; and said pitch "d" satisfies the following condition:

$$d \leq \lambda_0 \cdot 1/(1+\sin\theta)$$

when $\theta$ is the angle of incidence of a light which is incident via said half-wavelength plate to said wire grid unit, and $\lambda_0$ is the wavelength of the incident light.

4. The optical pickup according to claim 2, wherein:

said wire grid unit is positioned so that a main light is incident to the plane formed by said wire grid unit; and said pitch "d" satisfies the following condition:

$$d \leq \lambda_0 \cdot 1/\cos\theta$$

when $\theta$ is the angle of incidence of a light which is incident via said half-wavelength plate to said wire grid unit, and $\lambda_0$ is the wavelength of the incident light.

5. The optical pickup according to claim 1, wherein:

in said wire grid unit, said pitch "d" satisfies the following condition:

$$d \leq \lambda_0 \cdot (\sqrt{1+\cos^2\theta})/\cos\theta(\sqrt{2}+\sin\theta)$$

when $\theta$ is the angle of incidence of a light incident to said wire grid unit, and $\lambda_0$ is the wavelength of the incident light.

6. The optical pickup according to claim 1, wherein said light beam splitting means has a polarization beam splitter film.

7. The optical pickup according to claim 1, wherein said wire grid unit is positioned so that the angle of incidence of a main incident light is 60° or more.

8. An optical recording medium reproducing apparatus comprising:

a laser light source emitting a light beam;

an objective lens for focusing a light beam emitted from said laser light source on the data recording surface of an optical recording medium;

light receiving means for receiving a returned light from said optical recording medium, having a plurality of light receiving units;

light beam splitting means for splitting said returned light from said optical recording medium from the emitted light from said laser light source;

a wire grid unit positioned between, at least, a part of said light receiving means and said light beam splitting means, for transmitting a first polarization component in the light beam and reflecting a second polarization component, said wire grid unit being formed so that the ratio h/d of a pitch "d" to the thickness "h" of metal conductor constituting a wire is approximately 0.1 or more; and means for detecting an information signal on said optical recording medium, based on the output of one of the light receiving units for receiving the first polarization component of the light beam transmitted through said wire grid unit and also based on the output of another of the light receiving units for receiving the second polarization component of the light beam reflected by said wire grid unit.

9. The optical recording medium reproducing apparatus according to claim 8, wherein:

a half-wavelength plate is positioned between said light beam splitting means and said wire grid unit.

10. The optical recording medium reproducing apparatus according to claim 9, wherein:

said wire grid unit is positioned so that a main light is incident to a plane which is normal to the plane formed by said wire grid unit; and said pitch "d" satisfies the following condition:

$d \leq \lambda_0 \cdot 1/(1+\sin\theta)$ when $\theta$ is the angle of incidence of a light which is incident via said half-wavelength plate to said wire grid unit, and $\lambda_0$ is the wavelength of the incident light.

11. The optical recording medium reproducing apparatus according to claim 9, wherein:

said wire grid unit is positioned so that a main light is incident to the plane formed by said wire grid unit; and said pitch "d" satisfies the following condition:

$d \leq \lambda_0 \cdot 1/\cos\theta$ when $\theta$ is the angle of incidence of a light which is incident via said half-wavelength plate to said wire surface grid unit, and $\lambda_0$ is the wavelength of the incident light.

12. The optical recording medium reproducing apparatus according to claim 8, wherein:

in said wire grid unit, said pitch "d" satisfies the following condition:

$$d \leq \lambda_0 \cdot (\sqrt{1+\cos^2\theta})/\cos\theta(\sqrt{2}+\sin\theta)$$

when $\theta$ is the angle of incidence of a light incident to said wire grid unit, and $\lambda_0$ is the wavelength of the incident light.

13. The optical recording medium reproducing apparatus according to claim 8, wherein said light beam splitting means has a polarization beam splitter film.

14. The optical recording medium reproducing apparatus according to claim 8, wherein said wire grid unit is positioned so that the angle of incidence of a main incident light is 60° or more.

* * * * *